(12) United States Patent
Okada et al.

(10) Patent No.: US 12,297,893 B2
(45) Date of Patent: May 13, 2025

(54) SPEED REDUCER

(71) Applicant: MINEBEA MITSUMI Inc., Nagano (JP)

(72) Inventors: Mitsuhiro Okada, Kitasaku-gun (JP); Takayuki Nakamura, Kitasaku-gun (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 18/292,624

(22) PCT Filed: Jul. 27, 2022

(86) PCT No.: PCT/JP2022/028892
§ 371 (c)(1),
(2) Date: Jan. 26, 2024

(87) PCT Pub. No.: WO2023/008466
PCT Pub. Date: Feb. 2, 2023

(65) Prior Publication Data
US 2024/0288050 A1 Aug. 29, 2024

(30) Foreign Application Priority Data

Jul. 30, 2021 (JP) .................................. 2021-125778
Jul. 30, 2021 (JP) .................................. 2021-125779

(51) Int. Cl.
*F16H 1/28* (2006.01)
*F16H 57/08* (2006.01)

(52) U.S. Cl.
CPC ............. *F16H 1/28* (2013.01); *F16H 57/082* (2013.01); *F16H 2001/2881* (2013.01); *F16H 2057/085* (2013.01)

(58) Field of Classification Search
CPC .... F16H 1/28; F16H 57/082; F16H 2057/085; F16H 3/62
See application file for complete search history.

(56) References Cited

U.S. PATENT DOCUMENTS 5,012,693 A    5/1991   Enomoto et al.
5,879,261 A * 3/1999   Bayer ................... F16H 1/2809
                                                                    475/330

(Continued)

FOREIGN PATENT DOCUMENTS

JP    S62-024157 U    2/1987
JP    H02-009352 U    1/1990

(Continued)

OTHER PUBLICATIONS

International Search Report for corresponding International Application No. PCT/JP2022/028892 mailed Oct. 25, 2022.

(Continued)

*Primary Examiner* — Derek D Knight
(74) *Attorney, Agent, or Firm* — Chrisman Gallo Tochtrop LLC

(57) ABSTRACT

A speed reducer includes a sun gear, an internal gear, and a planetary gear meshing with the sun gear and the internal gear. The speed reducer includes two bearings disposed to sandwich the planetary gears in an axial direction. At least one of the two bearings is pressed against the planetary gears in an axial direction by the engaging members.

12 Claims, 25 Drawing Sheets

(56) References Cited

U.S. PATENT DOCUMENTS

| | | | |
|---|---|---|---|
| 8,075,439 B2 | 12/2011 | Ta et al. | |
| 8,523,451 B2 | 9/2013 | Ozu et al. | |
| 9,776,483 B2 * | 10/2017 | Shchokin | F16H 57/082 |
| 2004/0259677 A1 | 12/2004 | Shirokoshi | |
| 2009/0186736 A1 | 7/2009 | Ta et al. | |
| 2009/0252448 A1 | 10/2009 | Ozu et al. | |

FOREIGN PATENT DOCUMENTS

| | | |
|---|---|---|
| JP | H11-505309 A | 5/1999 |
| JP | 2002-181139 A | 6/2002 |
| JP | 2003-515077 A | 12/2004 |
| JP | 2005-009614 A | 1/2005 |
| JP | 2006-234177 A | 9/2006 |
| JP | 2009-197882 A | 9/2009 |
| JP | 4808569 B2 | 11/2011 |
| JP | 5561940 B2 | 7/2014 |
| JP | 2014-187794 A | 10/2014 |
| JP | 5807401 B2 | 11/2015 |
| JP | 5846954 B2 | 1/2016 |
| JP | 2018-066451 A | 4/2018 |
| JP | 2019-007588 A | 1/2019 |
| JP | 2019-039545 A | 3/2019 |
| JP | 2020-180670 A | 11/2020 |
| KR | 10-0966915 B1 | 6/2010 |

OTHER PUBLICATIONS

Written Opinion for corresponding International Application No. PCT/JP2022/028892 dated Oct. 25, 2022.
English translation of Written Opinion for corresponding International Application No. PCT/JP2022/028892 dated Oct. 25, 2022.
Decision of Refusal dated Mar. 26, 2025 for corresponding Japanese Application No. 2021-125778 and English translation.

* cited by examiner

SPEED REDUCER

CROSS-REFERENCE TO RELATED APPLICATIONS

This application is a national stage entry of International Application No. PCT/JP2022/028892, filed on Jul. 27, 2022, which claims priority to Japanese Patent Application Numbers 2021-125778 and 2021-125779, filed on Jul. 30, 2021, which are incorporated herein by reference.

TECHNICAL FIELD

The present invention relates to a speed reducer.

BACKGROUND ART

In a speed reducer employing a planetary gear mechanism, there is known a technique to support a carrier holding the planetary gears in a double support structure by disposing bearings to sandwich the planetary gears in the axial direction.

CITATION LIST

Patent Literature

Patent Document 1: JP 2020-180670 A
Patent Document 2: JP 2-9352 UM-A
Patent Document 3: JP 5561940 B

SUMMARY OF INVENTION

Technical Problem

In order to insert the carrier from the input side in the speed reducer with the double support structure, the size of the bearings at the output side may be made smaller than the inner diameter of the internal gear or the outer diameter of the plurality of planetary gears. In this case, since the two bearings have different sizes, the rigidity cannot be ensured, and pressure application to the planetary gears may be difficult to adjust.

In one aspect, a speed reducer capable of improving rigidity is to be provided.

Solution to Problem

In one aspect, a speed reducer includes a sun gear, an internal gear, and a planetary gear meshing with the sun gear and the internal gear. The speed reducer includes two bearings disposed to sandwich the planetary gear in an axial direction. At least one of the two bearings is pressed against the planetary gear in an axial direction by an engaging member.

According to one aspect, rigidity can be improved.

DESCRIPTION OF EMBODIMENTS

Figure 1:
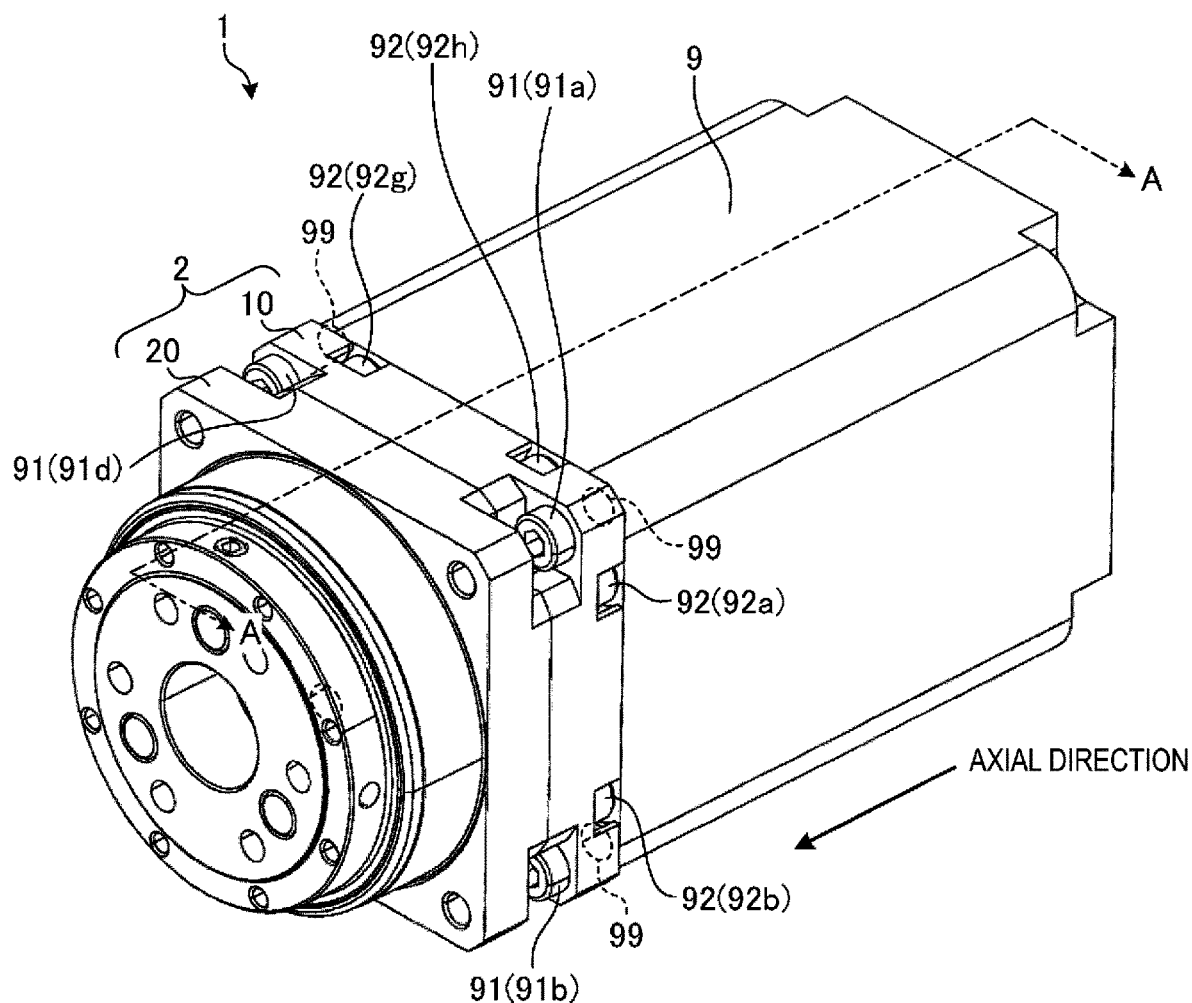
FIG. 1 is a perspective view illustrating an example of a drive device according to a first embodiment.

Embodiments of a speed reducer disclosed in the present application will be described below in detail with reference to the drawings. Note that dimensional relationships between elements and scales of elements in the drawings may differ from actual configurations. The drawings may include parts having mutually different dimensional relationships and scales. In order to make the description easier to understand, each drawing may illustrate a coordinate system. In the coordinate system, an extending direction of an output shaft 98 to be described below is defined as an axial direction and a rotation direction of the output shaft 98 is defined as a circumferential direction.

First Embodiment

First, a drive device according to a first embodiment will be described with reference to FIG. 1. FIG. 1 is a perspective view illustrating an example of a drive device according to a first embodiment. As illustrated in FIG. 1, the drive device 1 according to the present embodiment includes a speed reducer 2 and a motor 9. The speed reducer 2 includes a coupling part 10 and a main body part 20. In the following description, the side of the location of the motor 9 may be referred to as a negative direction side in the axial direction, and the side of the location of the speed reducer 2 may be referred to as a positive direction side in the axial direction.

Figure 2:
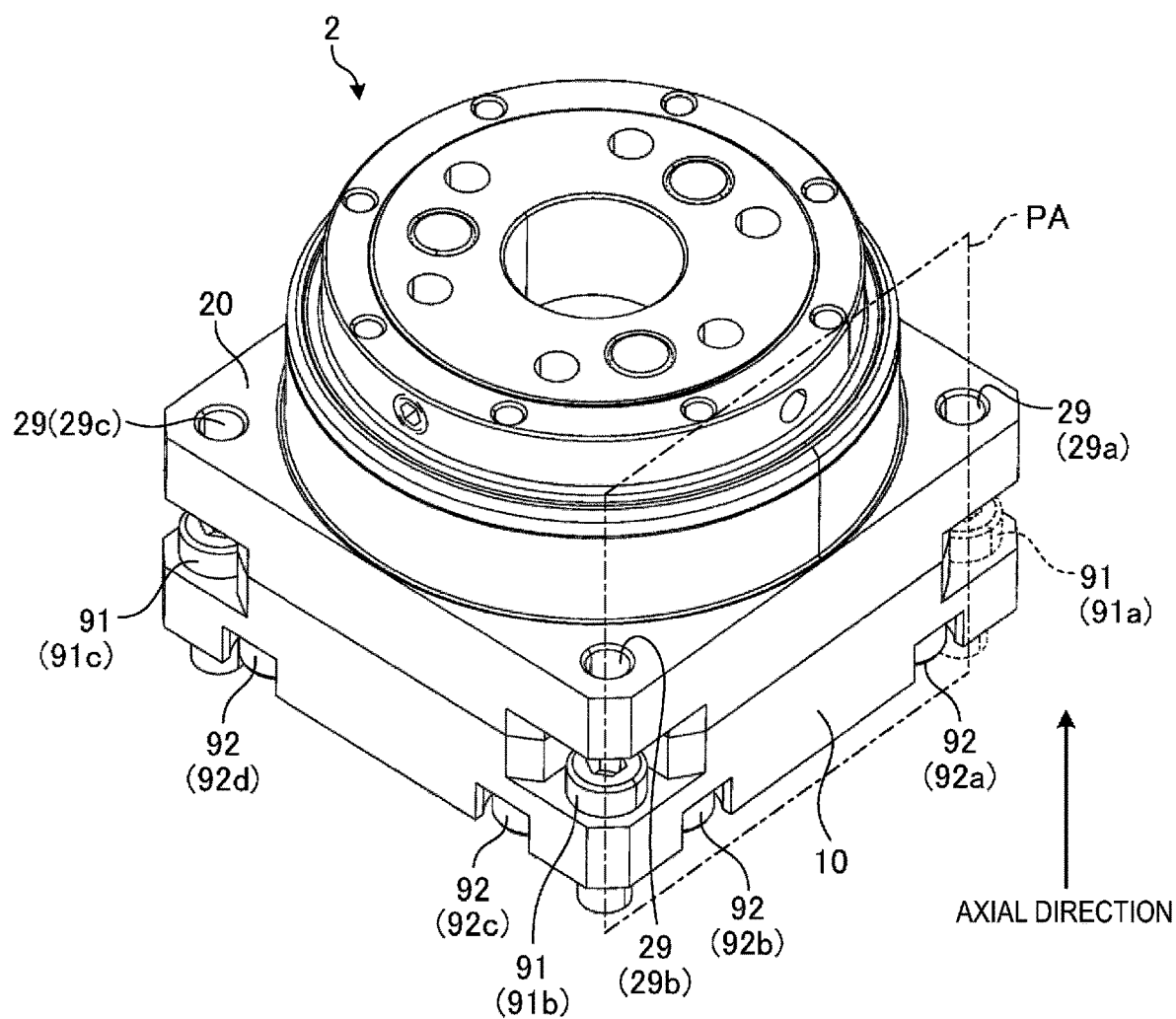
FIG. 2 is a perspective view illustrating one example of a speed reducer according to the first embodiment.
Figure 3:
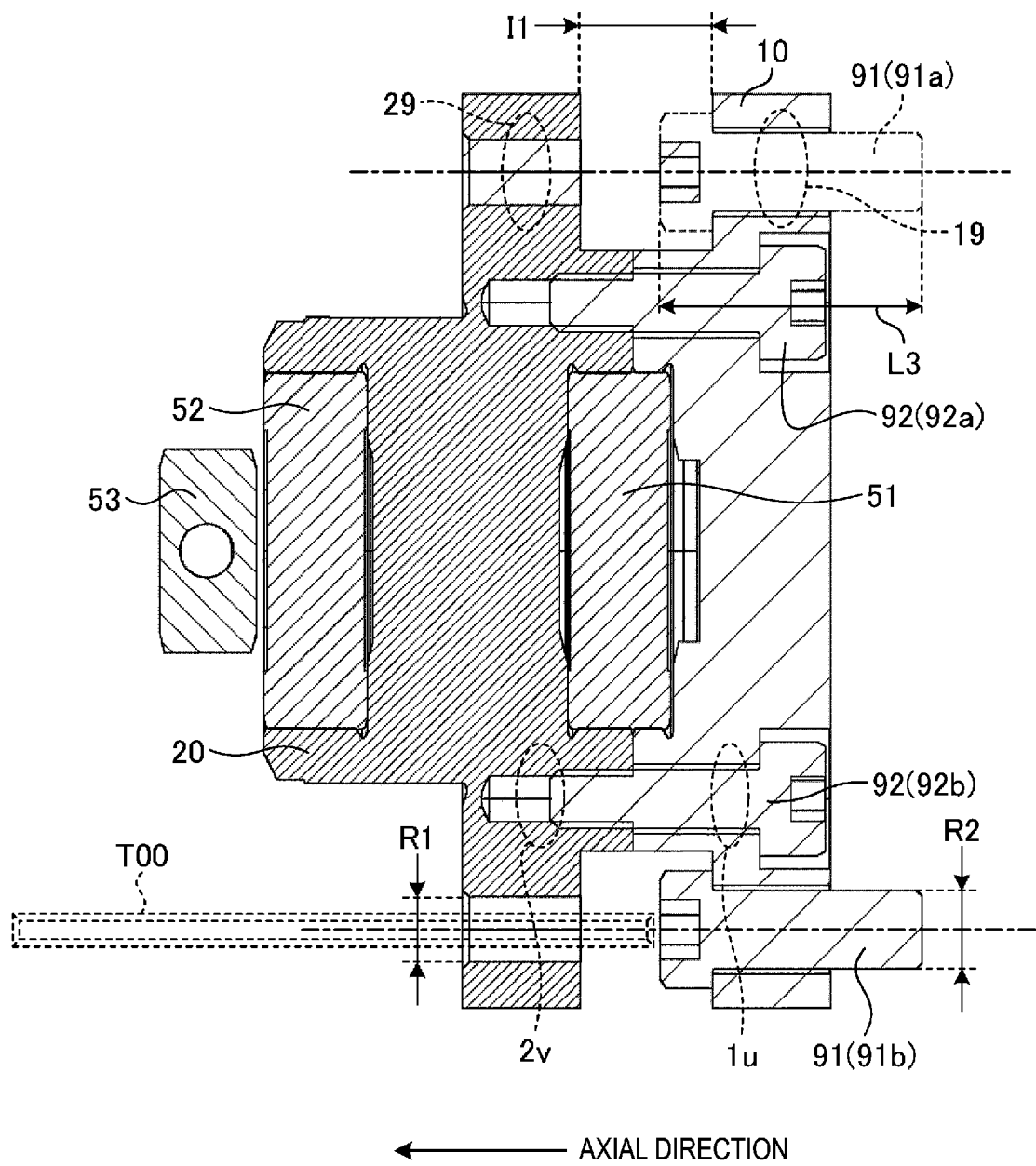
FIG. 3 is a side cross-sectional view illustrating an example of the speed reducer according to the first embodiment.

The main body part 20 of the speed reducer 2 is coupled to the motor 9 via the coupling part 10. More specifically, the coupling part 10 is fixed to the motor 9 by a plurality of first screws 91 illustrated in FIGS. 1 to 3, and is fixed to the main body part 20 by a plurality of second screws 92. FIG. 2 is a perspective view illustrating an example of the speed reducer according to the first embodiment. FIG. 3 is a side cross-sectional view illustrating an example of the speed reducer according to the first embodiment. FIG. 3 illustrates a cross section cut along the plane PA illustrated in FIG. 2. Note that, in the following description, four first screws 91 may be indicated as first screws 91a to 91d to distinguish them from each other, and eight second screws 92 may be indicated as second screws 92a to 92h to distinguish them from each other.

As illustrated in FIG. 3, the first screws 91 are inserted into through holes 19 formed in the coupling part 10 and fixed to screw grooves 99 formed in the motor 9 shown in FIG. 1. In addition, the second screws 92 are inserted into through holes 1u formed in the coupling part 10 and are fixed to the screw grooves 2v formed in the main body part 20. In addition, in the present embodiment, through holes 29 are formed in the main body part 20 at a position facing the through holes 19 of the coupling part 10 in the axial direction as illustrated in FIG. 3.

In the present embodiment, a size (length in the axial direction) L3 of the first screw 91 is larger than an interval I1 between the through hole 19 of the coupling part 10 and the through hole 29 of the main body part 20 in the axial direction as illustrated in FIG. 3, for example. In the present embodiment, for example, the length of the interval I1 is 5 mm, and the length L3 of the first screw 91 is 16 mm. In this case, the coupling part 10 and the main body part 20 are fixed to each other after the four first screws 91 are inserted into the through holes 19 of the coupling part 10, for example. In addition, the through holes 29 are formed such that the positions of the through holes 29 in a radial direction and the circumferential direction are substantially the same as the positions of the through holes 19 in the radial direction and the circumferential direction.

In this configuration, the first screws 91 can be fastened after the coupling part 10 and the main body part 20 are fixed to each other by inserting a tool T00 into a through hole 29 from the positive direction side in the axial direction as illustrated in FIG. 3. According to such a configuration, the length of a speed reducer 2 in the axial direction can be reduced, particularly in a speed reducer 2 with only one planetary gear stage. In this case, since the interval I1 is sufficiently smaller than the size of the tool T00, the speed reducer 2 can be fixed to the motor 9 without using a special tool or going through a special process. Note that an inner diameter R1 of the through hole 29 is, for example, greater than an outer diameter of the tool T00 and smaller than an inner diameter R2 of the through hole 19.

Figure 4:
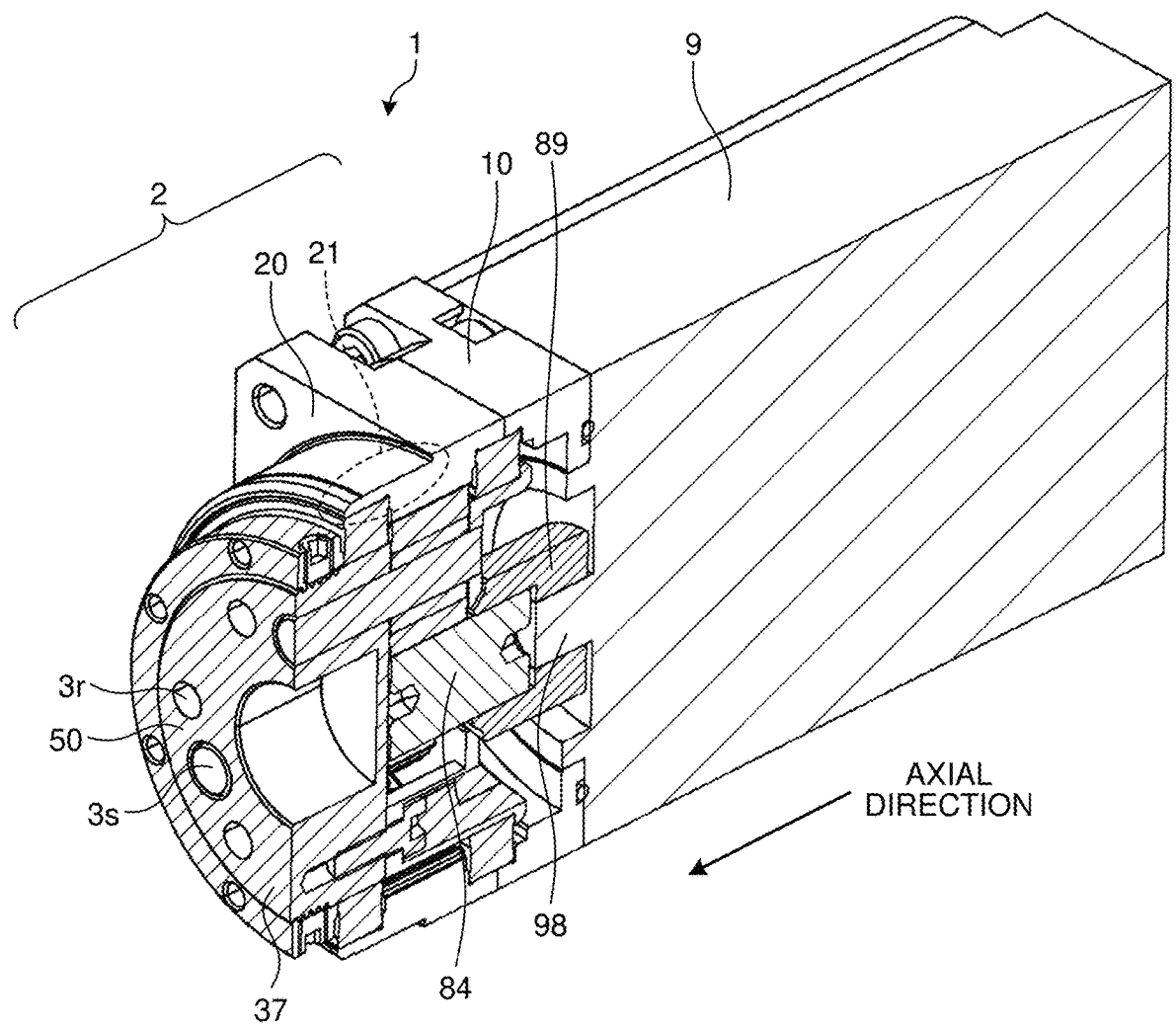
FIG. 4 is a cross-sectional perspective view illustrating an example of the drive device according to the first embodiment.

Next, a configuration for transmitting a driving force in the present embodiment will be described. FIG. 4 is a cross-sectional perspective view illustrating an example of the drive device according to the first embodiment. FIG. 4 illustrates a cross section cut along the line A-A in FIG. 1. An adapter 89 illustrated in FIG. 4 rotatably connects an output shaft 98 of the motor 9 to a sun gear 84. Thus, a driving force of the motor 9 is transmitted to the sun gear 84 via the output shaft 98 and the adapter 89.

The adapter 89 according to the present embodiment is disposed, for example, on an inner peripheral side of the coupling part 10 as illustrated in FIG. 4. Note that, as will be described below, the output shaft of the motor may be coupled to the sun gear 84, for example, in the form of being press-fitted into a radially inner side of the sun gear 84. In addition, the output shaft of the motor and the sun gear 84 may be integrally formed by gear-cutting an end portion of the output shaft in the axial direction.

Figure 5:
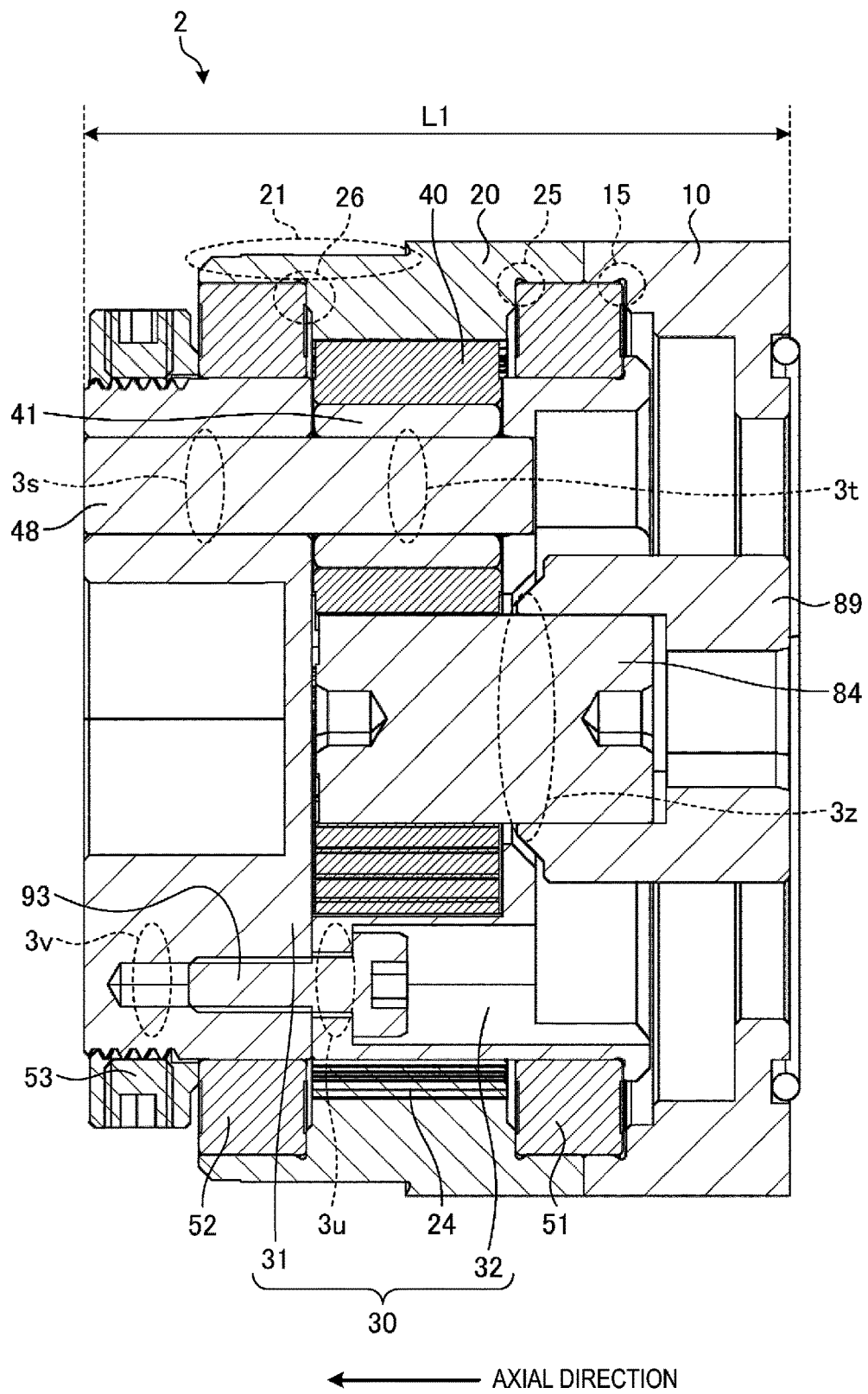
FIG. 5 is another side cross-sectional view illustrating an example of the speed reducer according to the first embodiment.

The sun gear 84 is engaged with a planetary gear 40 illustrated in FIG. 5 to transmit a driving force to the planetary gear 40. FIG. 5 is another side cross-sectional view illustrating an example of the speed reducer according to the first embodiment. FIG. 5 illustrates a cross section cut along the line A-A in FIG. 1. In the present embodiment, the planetary gear 40 is rotatably held by the carrier 30 via a planetary shaft 48 as illustrated in FIG. 5. The planetary gear 40 is rotatably supported by the planetary shaft 48 via a bearing 41 as illustrated in FIG. 5. In the present embodiment, for example, a roller bearing is used as the bearing 41. Note that the bearing 41 may be, for example, a full roller bearing with no cage.

Figure 6:
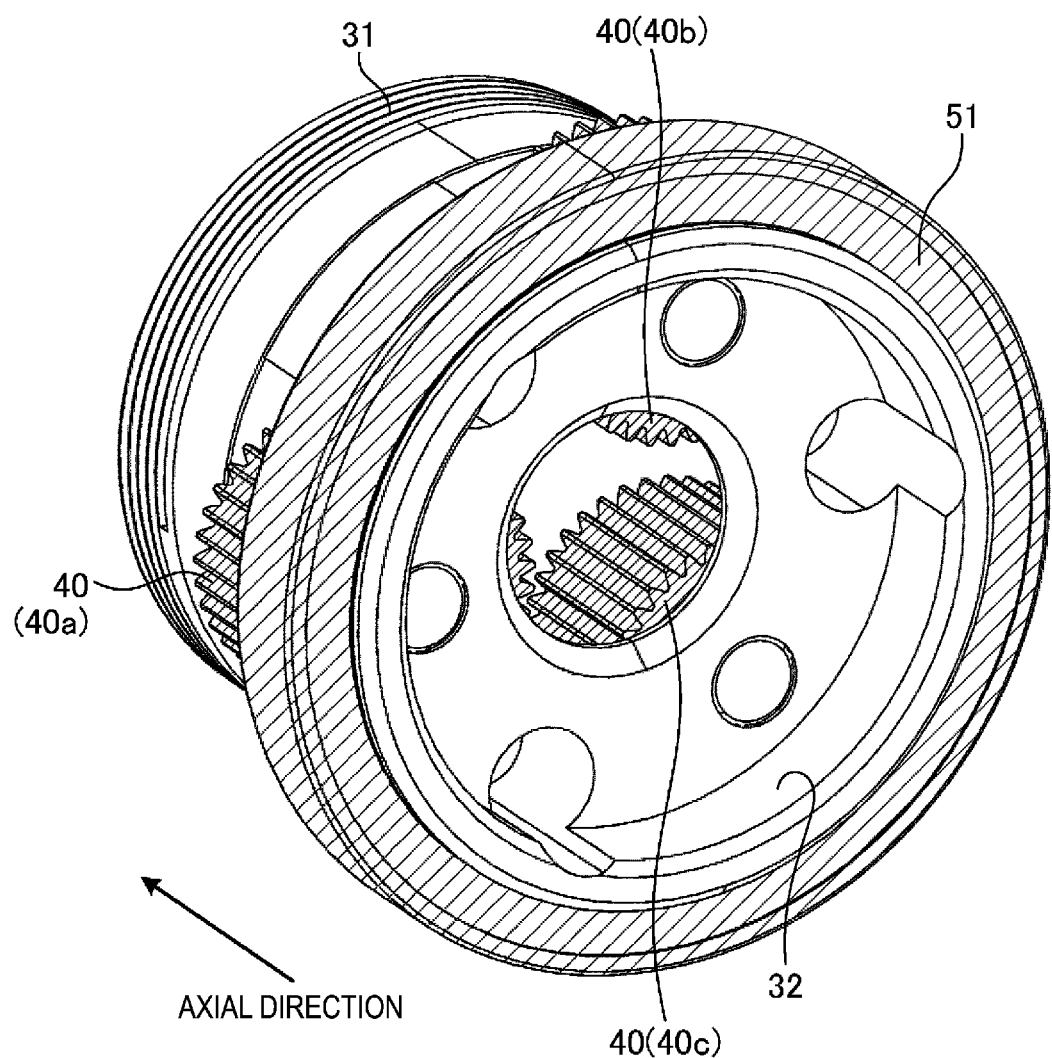
FIG. 6 is a view illustrating an example of a carrier equipped with a bearing according to the first embodiment.

A bearing 51 illustrated in FIG. 6 is mounted at the carrier 30 illustrated in FIG. 5. FIG. 6 is a view illustrating an example of the carrier equipped with the bearing according to the first embodiment. In the present embodiment, three planetary gears 40 are held by the carrier 30. Note that, the three planetary gears 40 may be described below as a planetary gear 40a to a planetary gear 40c to distinguish them from each other.

Figure 7:
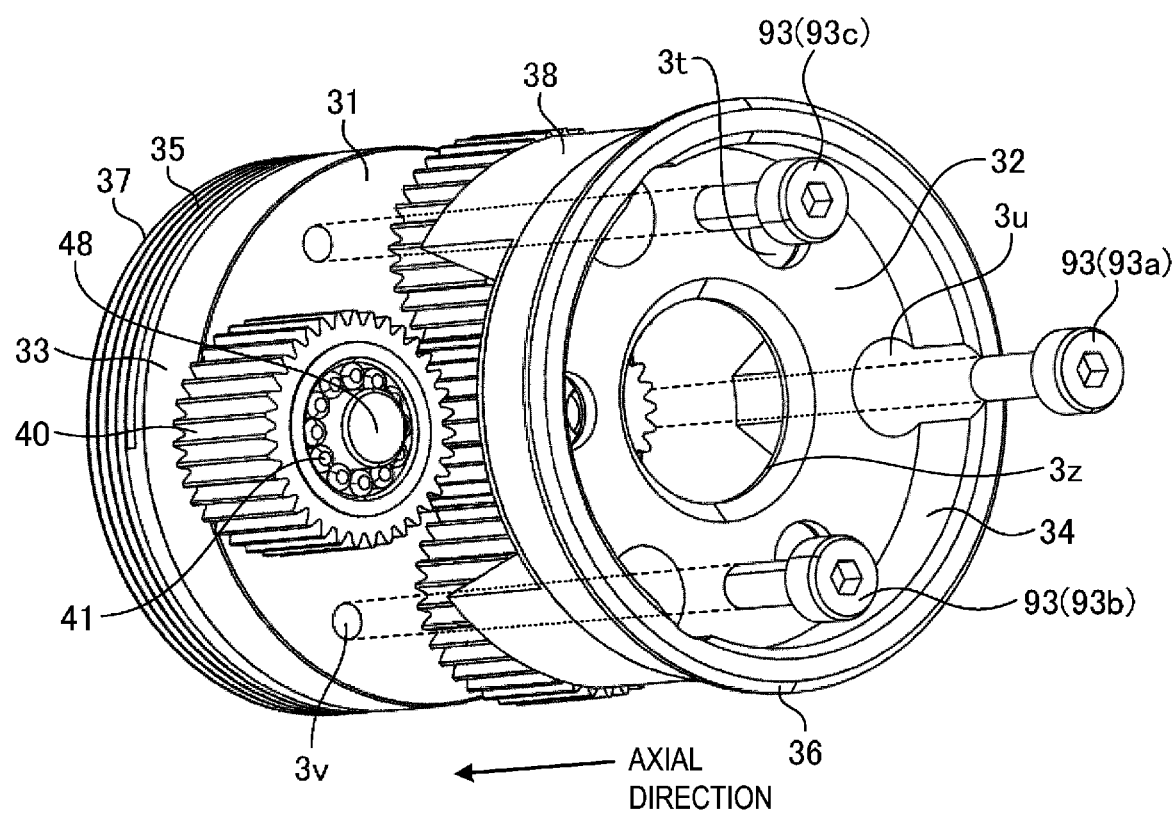
FIG. 7 is an exploded perspective view illustrating an example of the carrier according to the first embodiment.

The carrier 30 of the present embodiment includes a first member 31 and a second member 32 as illustrated in FIG. 6. The first member 31 and the second member 32 are assembled to face each other in the axial direction as illustrated in FIG. 7. FIG. 7 is an exploded perspective view illustrating an example of the carrier according to the first embodiment. The first member 31 includes an outer ring 33 and a coupling surface 37 as illustrated in FIG. 7. The second member 32 includes an outer ring 34 and a strut 38. The strut 38 is formed at a position adjacent to the planetary gears 40 in the circumferential direction as illustrated in FIG. 7.

The three planetary gears 40 in the present embodiment are held by the carrier 30 after the bearing 51 is mounted at the carrier 30. More specifically, the bearing 51 is mounted at the outer ring 34 of the second member 32 of the carrier 30 from the positive direction side in the axial direction. The first member 31 and the second member 32 are assembled after the bearing 51 is mounted at the second member 32. According to this configuration, the bearing 51 can be formed such that the outer diameter of the bearing 51 is positioned at a radially outer side of the tooth tips of the planetary gears 40 in the radial direction.

In addition, a through hole 3s and a screw groove 3v are formed in the first member 31, and through holes 3u, 3t, and 3z are formed in the second member 32 as illustrated in FIG. 5. The through hole 3u is formed to pass through the strut 38 in the axial direction as illustrated in FIG. 7. The planetary shafts 48 illustrated in FIG. 5 are inserted into the through holes 3s and 3t. In addition, the first member 31 and the second member 32 are positioned by the planetary shafts 48 to be assembled.

An internal gear 24 is formed at the inner peripheral side of the main body part 20 as illustrated FIG. 5. The planetary gears 40 rotating in conjunction with the sun gear 84 mesh with the internal gear 24 to revolve along the internal gear 24. At this time, the carrier 30 holding the planetary gears 40 via the planetary shafts 48 rotates in conjunction with the revolution of the planetary gears 40. Note that the internal gear 24 in the present embodiment is fixed to the main body part 20 and does not rotate regardless of the revolution or rotation of the planetary gears 40.

An external screw 35 is formed on the outer ring 33 of the first member 31, and a flange 36 is formed on the outer ring 34 of the second member 32 as illustrated in FIG. 7. A nut 53 illustrated in FIG. 5 is mounted at the external screw 35. A bearing 51 mounted from the positive direction side in the axial direction is supported by the flange 36.

In the present embodiment, the first member 31 and the second member 32 are fixed by third screws 93 as illustrated in FIG. 7. The three third screws 93a to 93c are inserted into the through holes 3u formed in the second member 32 and are respectively fixed to the screw grooves 3v formed in the first member 31. Note that the third screws 93 are an example of a locking member.

The carrier 30 of the present embodiment is constituted by two members, namely, the first member 31 and the second member 32 as described above. In addition, the first member 31 and the second member 32 are positioned by the planetary shafts 48. According to this configuration, workability and assemblability of the carrier 30 are improved, and a decrease in the accuracy of the planetary gears 40 can be curbed.

Figure 8:
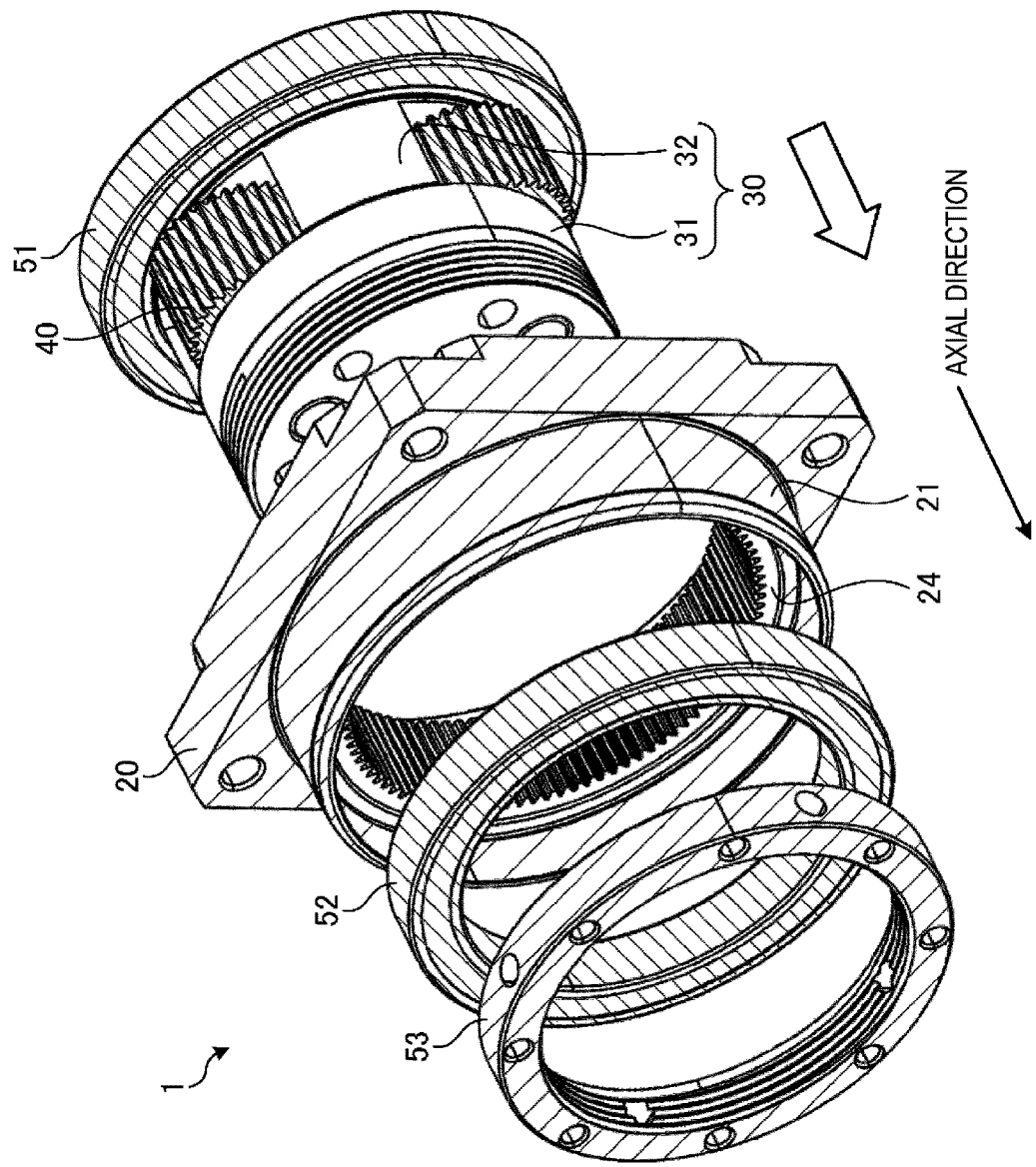
FIG. 8 is an exploded perspective view illustrating an example of a speed reducer assembly process according to the first embodiment.
Figure 9:
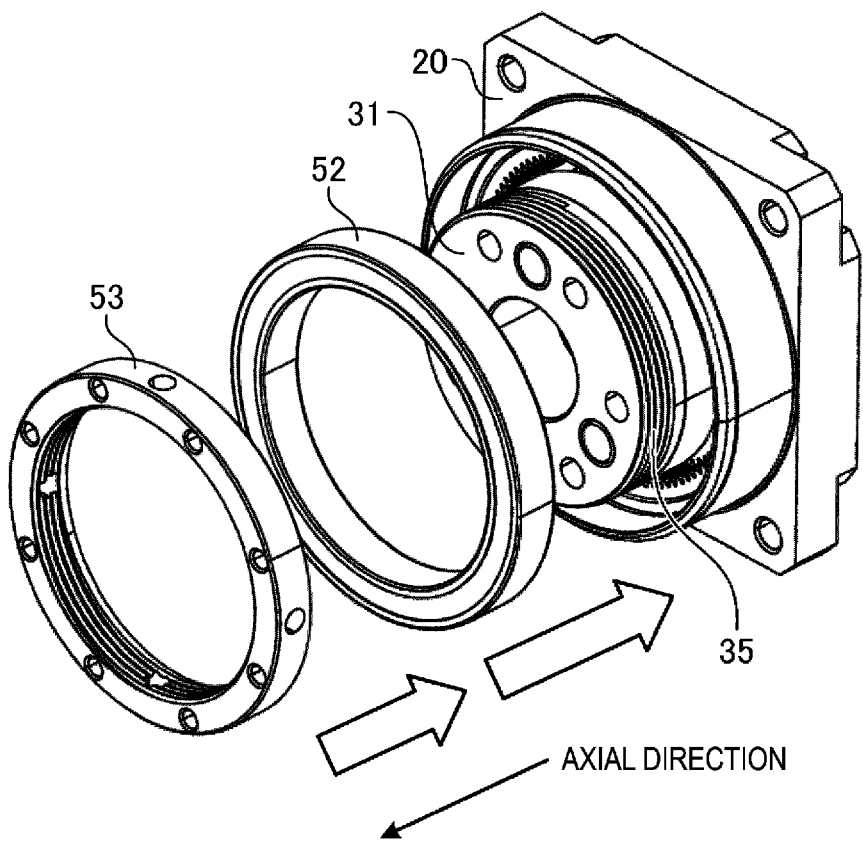
FIG. 9 is an exploded perspective view illustrating an example of the speed reducer assembly process according to the first embodiment.

The carrier 30 is assembled in a state of having the bearing 51 mounted as illustrated in FIG. 6 and the planetary gears 40 being positioned, and then the carrier 30 is inserted into the main body part 20 from the negative direction side in the axial direction as indicated by the arrow in FIG. 8. FIG. 8 is an exploded perspective view illustrating an example of a speed reducer assembly process according to the first embodiment. A portion including the external screw 35 of the first member 31 of the carrier 30 inserted into the main body part 20 protrudes further toward the positive direction side in the axial direction than the end portion of the main body part 20 at the positive direction side in the axial direction as illustrated in FIG. 9. FIG. 9 is an exploded perspective view illustrating an example of the speed reducer assembly process according to the first embodiment. Then, a bearing 52 and a nut 53 are further attached to the first member 31 of the carrier 30 inserted into the main body part 20 as indicated by the arrows in FIG. 9.

In the present embodiment, the bearing 52 is attached to the outer ring 33 of the first member 31 from the positive direction side in the axial direction. In the present embodiment, the bearings 51 and 52 are formed to have substantially the same size in the radial direction. In addition, the nut 53 is further mounted at the carrier 30 with the bearing 52 mounted. Note that the nut 35 is an example of an engaging member. In addition, in the following description, the carrier 30 holding the planetary gears 40 and further having the bearings 51 and 52 and the nut 53 mounted may be referred to as a revolving part 50.

Figure 10:
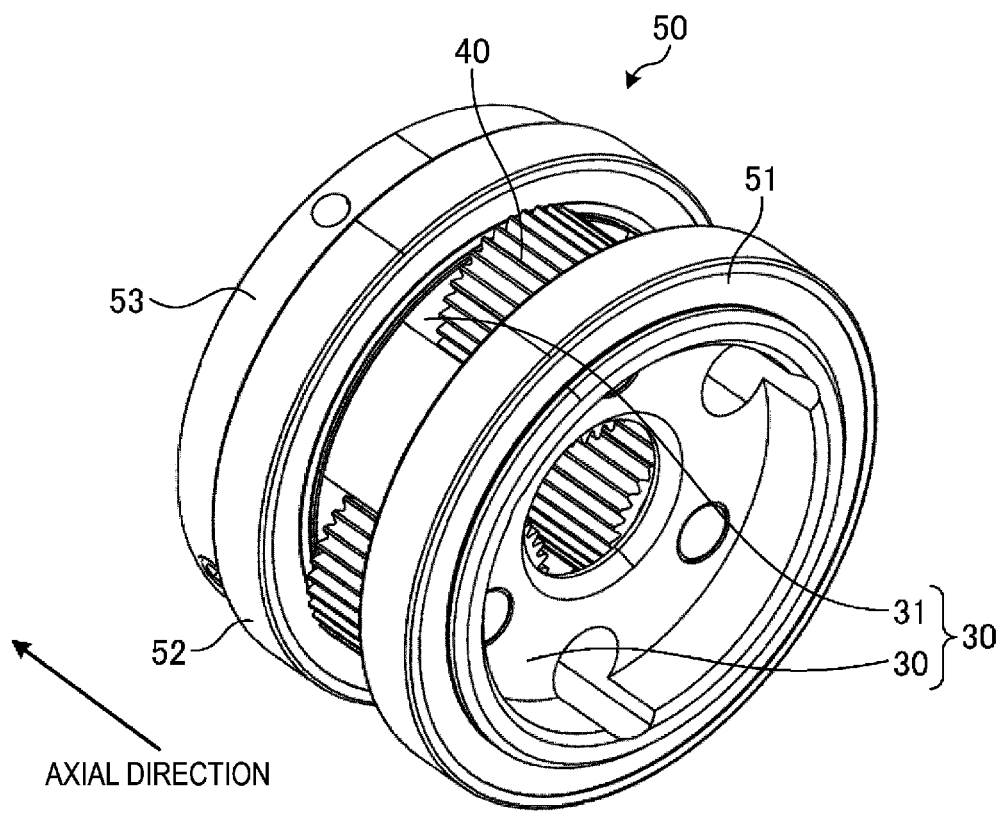
FIG. 10 is a perspective view illustrating an example of a revolving part according to the first embodiment.

FIG. 10 is a perspective view illustrating an example of the revolving part according to the first embodiment. The planetary gears 40 are interposed between the bearing 51 and the bearing 52 in the axial direction as illustrated in FIG. 10. Note that, although not illustrated in FIG. 10, the bearing 52 is mounted at the carrier 30 such that the internal gear 24 of the main body part 20 is interposed between the bearing 52 and the bearing 51 in the axial direction.

The nut 53 presses the bearings 51 and 52 toward the negative direction side in the axial direction. In this case, the bearing 51 positioned at the input side (the negative direction side in the axial direction) is pressed against a receiving part 15 of the coupling part 10 and the flange 36 of the second member 32 by the nut 53. In addition, the bearing 52 positioned at the output side (the positive direction side in the axial direction) is pressed by the nut 53 against the planetary gears 40, the receiving part 26 of the main body part 20, and the internal gear 24.

According to this configuration, the inner rings of the two bearings 51 and 52 are in contact with the internal gear 24 in the axial direction and are both supported by the main body part 20 in the radial direction. As a result, the occurrence of warping or the like due to a load caused by rotation of the carrier 30 is curbed.

In the present embodiment, in order to reduce the interval I1 illustrated in FIG. 3, a part of the coupling part 10 at the positive direction side in the axial direction is positioned further at the positive direction side in the axial direction than the end portion of the bearing 51 at the negative direction side in the axial direction. That is, the receiving part 15 formed in the coupling part 10 faces the bearing 51 in the radial direction as illustrated in FIG. 5. Thus, a part of the bearing 51 is further supported by the receiving part 15 of the coupling part 10 in the axial direction and the radial direction. According to this configuration, loads of the carrier 30 are dispersed to the coupling part 10 in addition to the main body part 20.

Note that, for example, grooves 3r for fixing a driving target are formed in the coupling surface 37 of the first member as illustrated in FIG. 4. In the present embodiment, for example, a driving target (not illustrated) such as a robot arm is fixed to the first member 31 by a screw or the like, to rotate in conjunction with the carrier 30. In addition, in the present embodiment, a spigot part 21 to be coupled to a driving object or the like is formed on the outer peripheral surface of the main body part 20 as illustrated in FIGS. 4 and 5.

As described above, the bearings 51 and 52 are assembled to sandwich the internal gear 24 in the axial direction in the present embodiment. In this configuration, the outer diameter of the bearing 52 at the output side (the positive direction side in the axial direction) can be made the same as the outer diameter of the bearing 51 at the input side (the positive direction side in the axial direction). Thus, the bearing 51 can tolerate a sufficient amount of load. In addition, since the amount of pressure applied to the bearings 51 and 52 can be appropriately adjusted by adjusting the degree of tightening by the nut 53, tilting of the gears can be reduced, backlash can be reduced, and the durability of the gears can be improved.

In the present embodiment, the carrier 30 includes the second member 32 with the bearing 51 mounted and the first member 31 with the bearing 52 mounted. For this reason, the assemblability and processability of the carrier 30 supported at both sides by the two bearings can be improved. In addition, since the first member 31 and the second member 32 are reinforced by the third screw 93, loosening of the first member 31 and the second member 32 in the axial direction is curbed.

As described above, the speed reducer 2 according to the present embodiment includes the sun gear 84, the internal gear 24, and the planetary gears 40 meshing with the sun gear 84 and the internal gear 24. The speed reducer 2 includes the two bearings 51 and 52 disposed to sandwich the planetary gears 40 in the axial direction. At least one of the two bearings 51 and 52 is pressed against the planetary gears 40 in the axial direction by the engaging member 53. Furthermore, the two bearings 51 and 52 have the same size in the radial direction. According to this configuration, since the carrier 30 holding the planetary gears 40 is supported at both sides by the two bearings 51 and 52 having substantially the same size in the radial direction, the rigidity of the speed reducer 2 can be improved. In addition, since the amount of pressure applied to the bearings 51 and 52 varies depending on the degree of tightening of the nut 53, the amount of pressure can be easily adjusted.

Modifications

Although the configurations of the present embodiment have been described above, the embodiment is not limited to such configurations. For example, the strut 38 may be formed on the first member 31 of the carrier 30, instead of the second member 32. In addition, the number of struts 38 is not limited to that described above and may be different from the number of planetary gears 40 included in the carrier 30.

Figure 11:
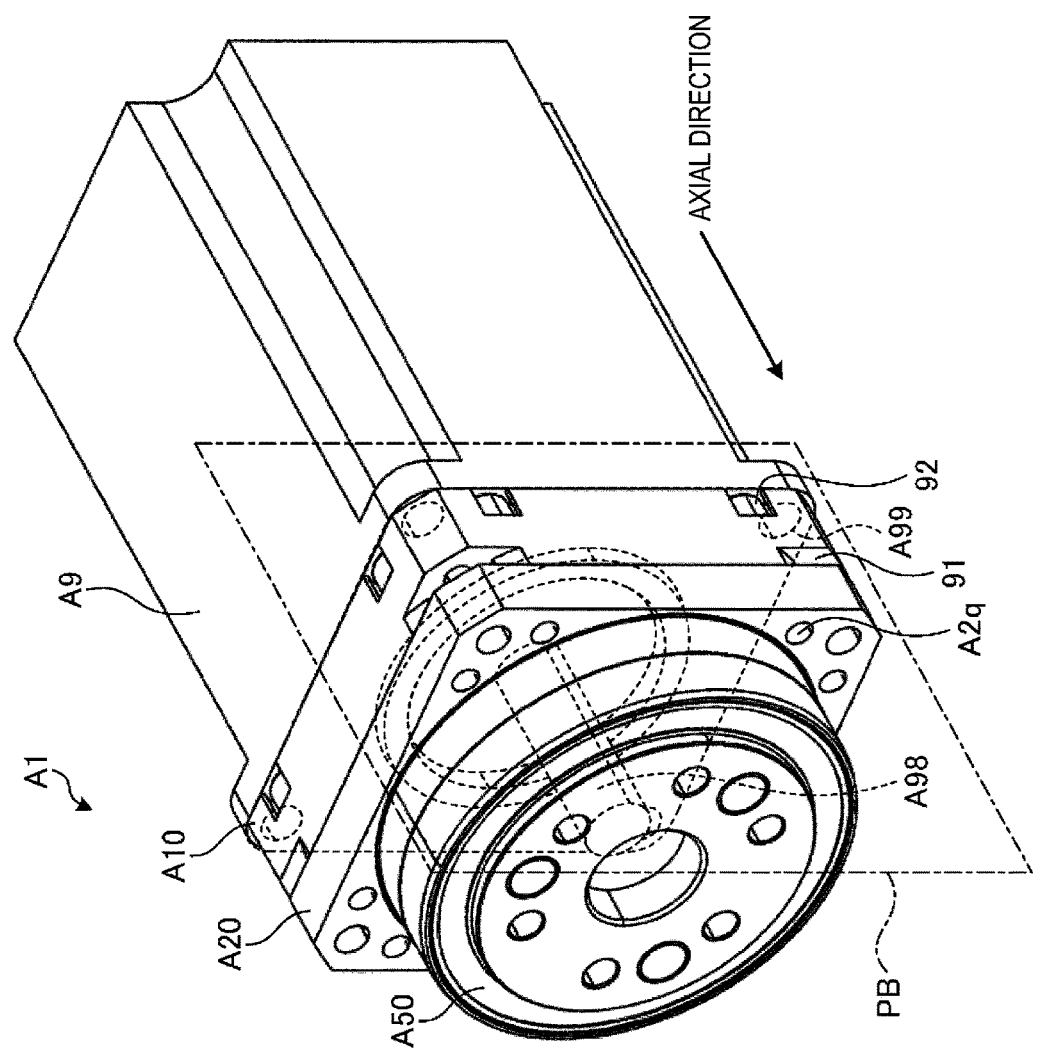
FIG. 11 is a perspective view illustrating an example of a speed reducer according to a first modification.
Figure 12:
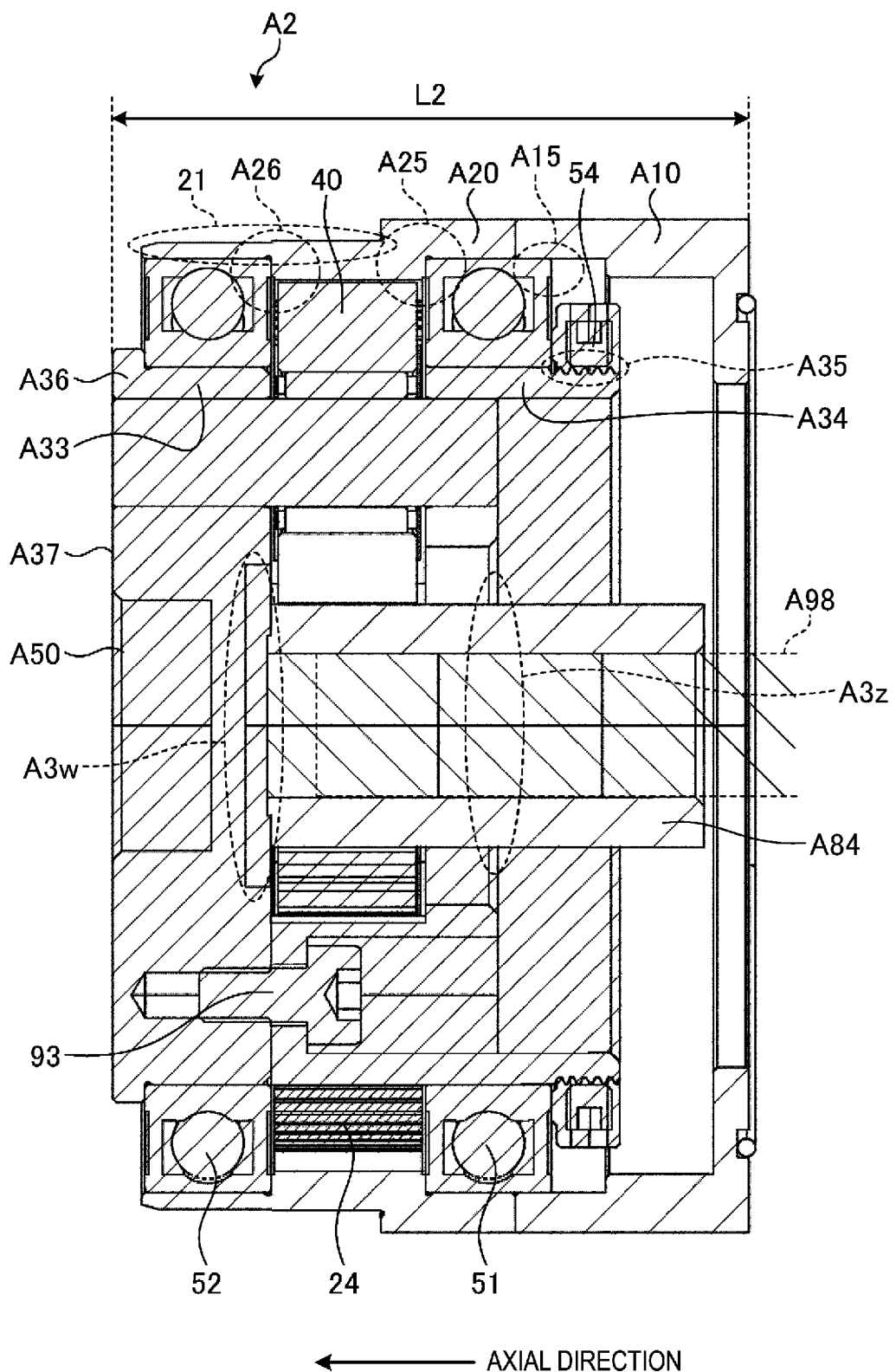
FIG. 12 is a side cross-sectional view illustrating an example of the speed reducer according to the first modification.
Figure 13:
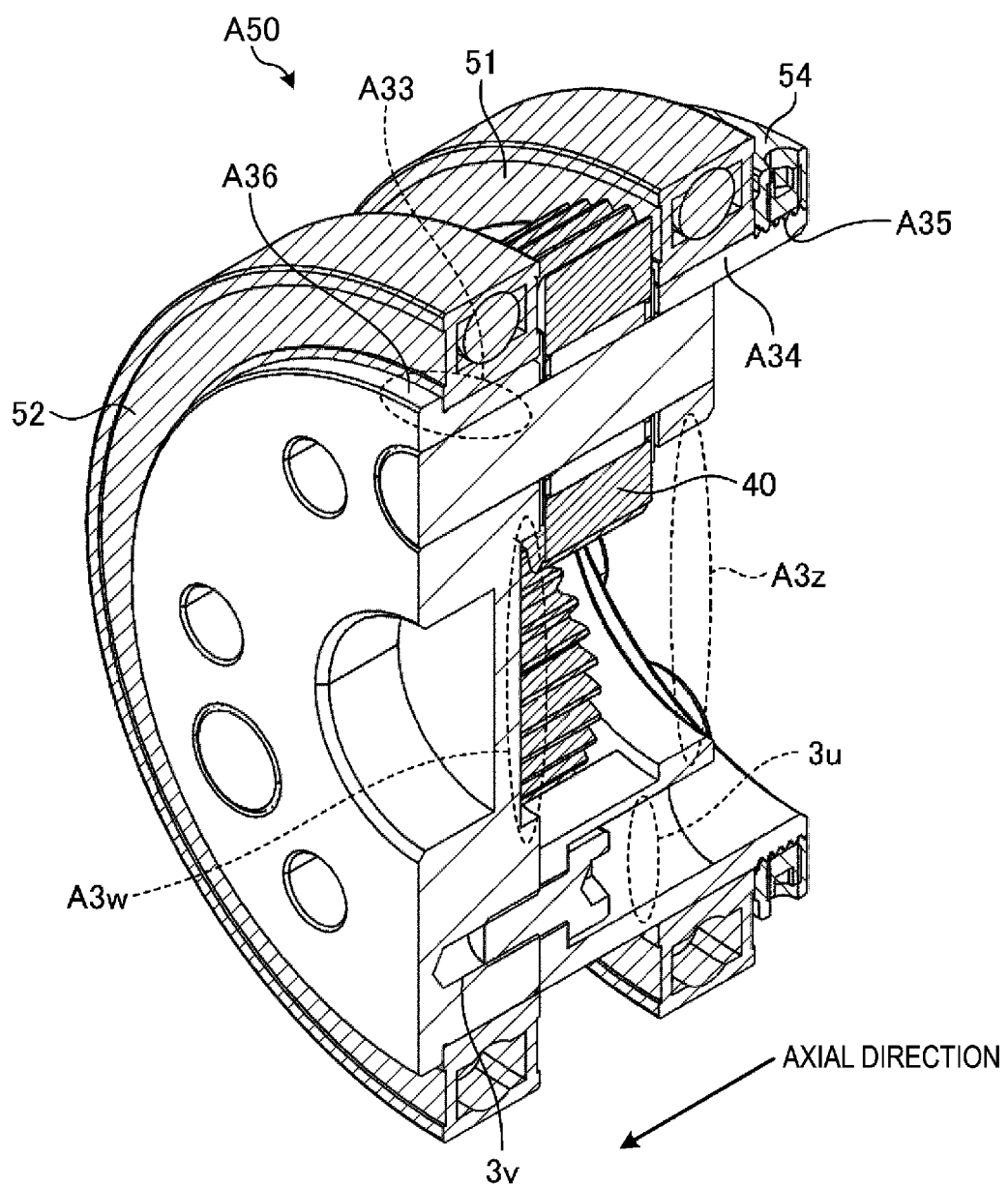
FIG. 13 is a cross-sectional perspective view illustrating an example of a revolving part according to a first modification.
Figure 14:
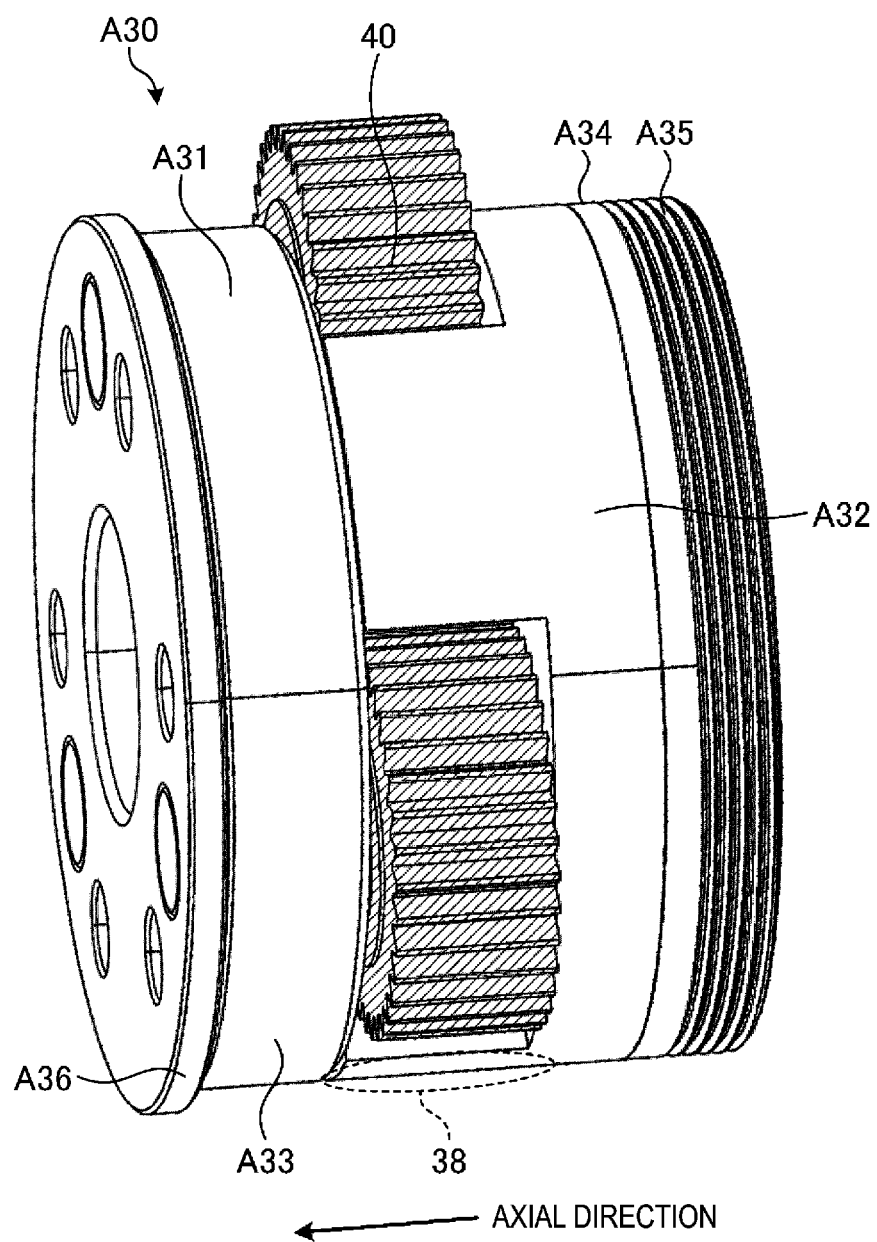
FIG. 14 is a perspective view illustrating an example of a carrier according to the first modification.

In addition, although the nut 53 for pressing the bearings 51 and 52 has been described as being mounted at the output side (the positive direction side in the axial direction), the nut may be mounted at the input side (the negative direction side in the axial direction) as illustrated in FIGS. 11 to 14. FIG. 11 is a perspective view illustrating an example of a speed reducer according to a first modification. FIG. 12 is a side cross-sectional view illustrating an example of the speed reducer according to the first modification. FIG. 13 is a cross-sectional perspective view illustrating an example of a revolving part according to the first modification. FIG. 14 is a perspective view illustrating an example of a carrier according to the first modification. FIGS. 12 and 13 illustrates a cross section cut along the plane PB illustrated in FIG. 11. Note that, in the following modifications and embodiments, parts identical to the parts illustrated in the drawings described previously are designated by the same reference numerals, and duplicate description will be omitted.

A drive device A1 in the first modification includes a motor A9 and a speed reducer A2 as illustrated in FIG. 11. A carrier A30 in the first modification includes a first member A31 and a second member A32 as illustrated in FIG. 14. In the first modification, a flange A36 is formed on an outer ring A33 of the first member A31, and an external screw A35 is formed on an outer ring A34 of the second member A32. In addition, the first member A31 further includes a coupling surface A37, and a recessed portion A3w is further formed at a central portion of the first member A31 in the radial direction. Note that, although FIG. 14 illustrates the carrier A30 with no bearing 52 mounted, when a speed reducer A2 is assembled, the bearing 52 is attached to the first member A31, and thus the second member A32 is fixed to the first member A31 such that the planetary gears 40 are held between the first member A31 and the second member A32.

In the first modification, the bearing 52 is mounted at the carrier A30 before the bearing 51 is mounted. In the first modification, the bearing 52 is mounted at the outer ring A33 of the first member A31 from the negative direction side in the axial direction. Then, the first member A31 and the second member A32 are combined to hold the three planetary gears 40.

The carrier A30 with the bearing 52 mounted is inserted into the main body part A20 from the positive direction side in the axial direction. Then, the bearing 51 and the nut 54 are further mounted at the carrier A30 inserted into the main body part A20 from the negative direction side in the axial direction as illustrated in FIG. 13. In the first modification, the bearing 52 is supported in the radial direction by a receiving part A26 formed in the main body part A20. In addition, the bearing 51 is supported in the radial direction by a receiving part A25 formed in the main body part A20 and a receiving part A15 formed in the coupling part A10. Note that, in FIG. 13, illustration of an internal gear A24 sandwiched between the bearing 51 and the bearing 52 in the axial direction is omitted.

Furthermore, in the first modification, an output shaft A98 of a motor A9 illustrated in FIG. 11 is press-fitted to the radially inner side of a sun gear A84 as illustrated in FIG. 12. The sun gear A84 is inserted into a through hole A3z of the carrier A30 and is supported by the recessed portion A3w. With this configuration, a driving force of the motor A9 is transmitted to the planetary gears 40 via the sun gear A84. Note that the first screws 91 inserted into the coupling part A10 are fixed to screw grooves A99 formed in the motor A9 as illustrated in FIG. 11.

In this configuration according to the first modification, the portion of the sun gear A84 at the negative direction side in the axial direction is suppressed from protruding from the end part of a revolving part A50 at the negative direction side in the axial direction. As a result, a thickness (length in the axial direction) L2 of the speed reducer A2 illustrated in FIG. 12 can be made smaller than a thickness L1 of the speed reducer 2 illustrated in FIG. 5 while the length of the sun gear A84 is maintained.

In addition, in the first modification, the nut 54 protrudes toward the coupling part A10 side in the axial direction as illustrated in FIG. 12. In this case, when the coupling part A10 is fixed to the motor A9, the nut 54 is not visible. According to this configuration, the nut 54 can be prevented from being subjected to an unintended operation such as disassembly after the speed reducer A2 has been assembled.

Furthermore, in the first modification, even when the length of the adapter 89 in the axial direction is increased in order to maintain the slip torque of the sun gear A84, the length of the speed reducer A2 in the axial direction can be reduced. However, in the first modification, the output shaft A98 is desirably inserted into the sun gear A84. According to this configuration, the length of the speed reducer A2 in the axial direction can be further reduced while maintaining the length of the sun gear A84 in the axial direction.

Furthermore, a through hole A2q for insertion of the second screw 92 may be formed in the main body part A20 instead of a screw groove 2v in the first embodiment as illustrated in FIG. 11. Since the thicknesses (lengths in the axial direction) of the main body part A20 can be reduced due to this configuration as will be described later, the length of the speed reducer A2 in the axial direction can be further reduced.

Second Embodiment

Although the configuration of the speed reducer 2 provided with only one stage of the planetary gears 40 in the first embodiment is described, the embodiment is not limited to the above-described configuration. For example, two or more stages of the planetary gears 40 may be included. Note that, in the following description, each member such as each of the planetary gears 40 described in the first embodiment may be attached with the term "first" such as in the case of "first planetary gear 40".

Figure 15:
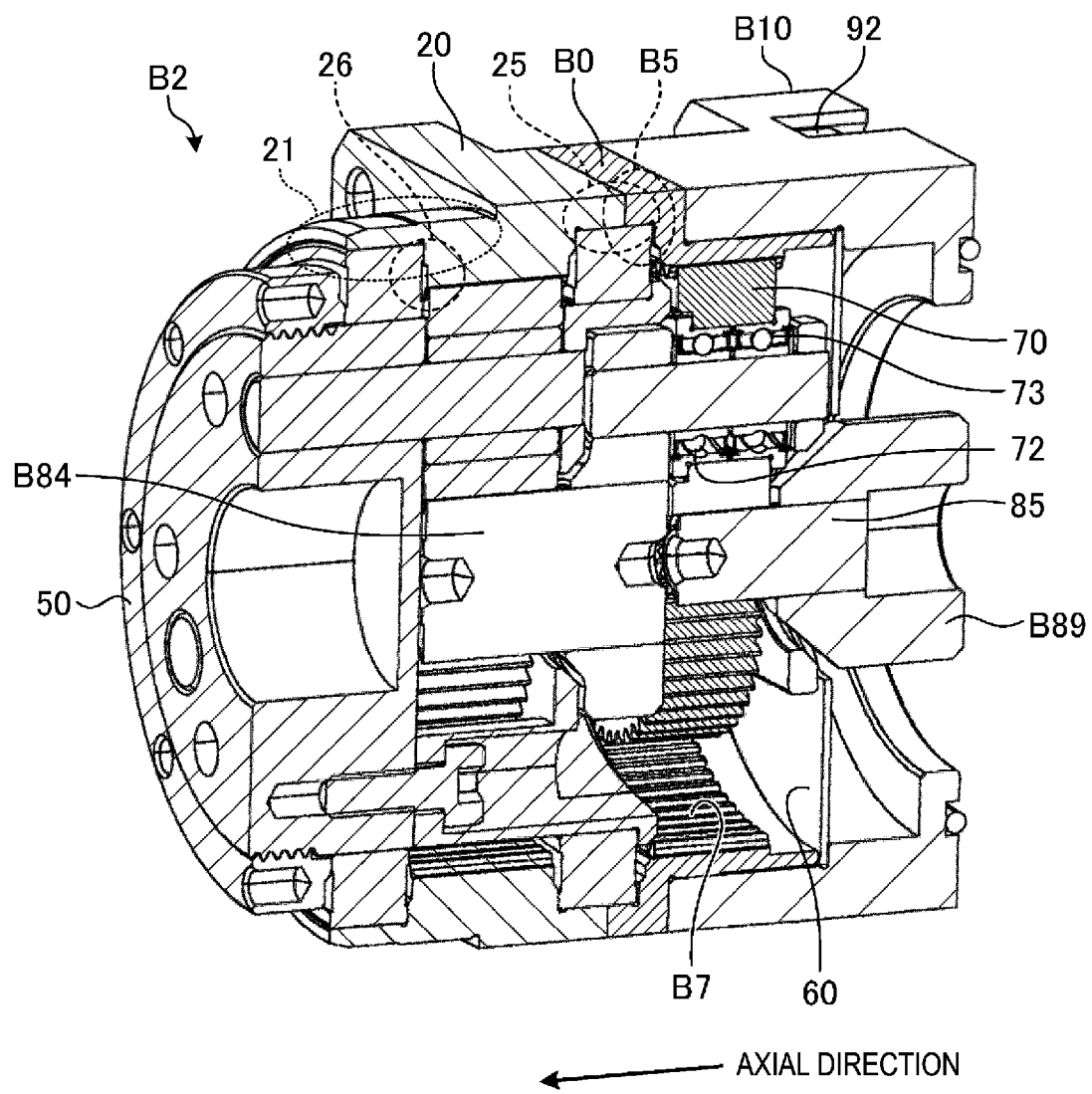
FIG. 15 is a cross-sectional perspective view illustrating an example of a speed reducer according to a second embodiment.

In a second embodiment, a speed reducer further including second planetary gears 70 in addition to the first planetary gears 40 as illustrated in FIG. 15 will be described. FIG. 15 is a cross-sectional perspective view illustrating an example of the speed reducer according to the second embodiment. The speed reducer B2 according to the second embodiment further includes a second main body part B0 between a coupling part B10 and a first main body part 20 in the axial direction as illustrated in FIG. 15. In the second embodiment, a second screw 92 is further inserted into, for example, a through hole (not illustrated) formed in the second main body part B0. As a result, the coupling part B10, the second main body part B0, and the first main body part B20 are fixed to each other. Note that, in the second embodiment, the bearing 51 may be supported by a receiving part B5 formed in the second main body part B0 as illustrated in FIG. 15, instead of the receiving part 15 of the coupling part 10 in the first embodiment.

The speed reducer B2 further includes a second carrier 60 holding the three second planetary gears 70 in addition to the revolving part 50 including a first carrier 30 holding the first planetary gears 40. A second sun gear 85 is inserted into the second carrier 60 from the negative direction side in the axial direction as illustrated in FIG. 15. The second planetary gears 70 rotate in conjunction with the second sun gear 85. In addition, an adapter B89 is connected to the second sun gear 85. The adapter B89 is mounted at an output shaft of a motor not illustrated. Thus, a driving force of the motor is transmitted to the second sun gear 85 via the adapter B89.

A second internal gear B7 is formed at the inner peripheral side of the second main body part B0. The second planetary gears 70 rotate in conjunction with the second sun gear 85 to mesh with the second internal gear B7 and revolve around the second internal gear B7. The second carrier 60 holding the second planetary gears 70 rotates in accordance with the revolution of the second planetary gears 70. In addition, in the second embodiment, a first sun gear B84 inserted into the revolving part 50 rotates in conjunction with the second carrier 60. In the second embodiment, the second carrier 60 disposed at the input side (negative direction side in the axial direction) may be a so-called float type self-aligning carrier without support of a bearing because the influence of the second carrier on the backlash is smaller than the influence of the first carrier 30.

Figure 16:
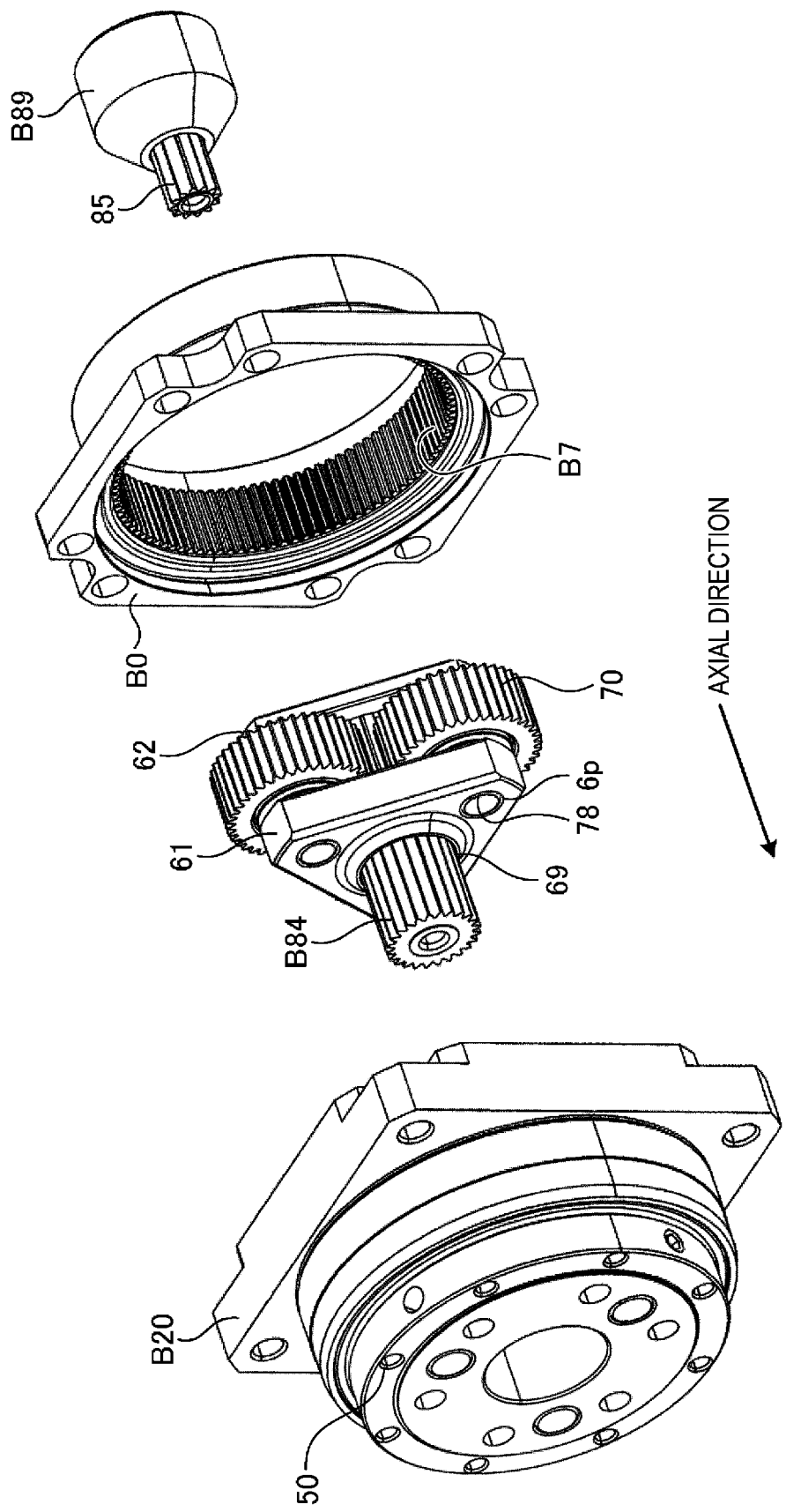
FIG. 16 is an exploded perspective view illustrating an example of the speed reducer according to the second embodiment.
Figure 17:
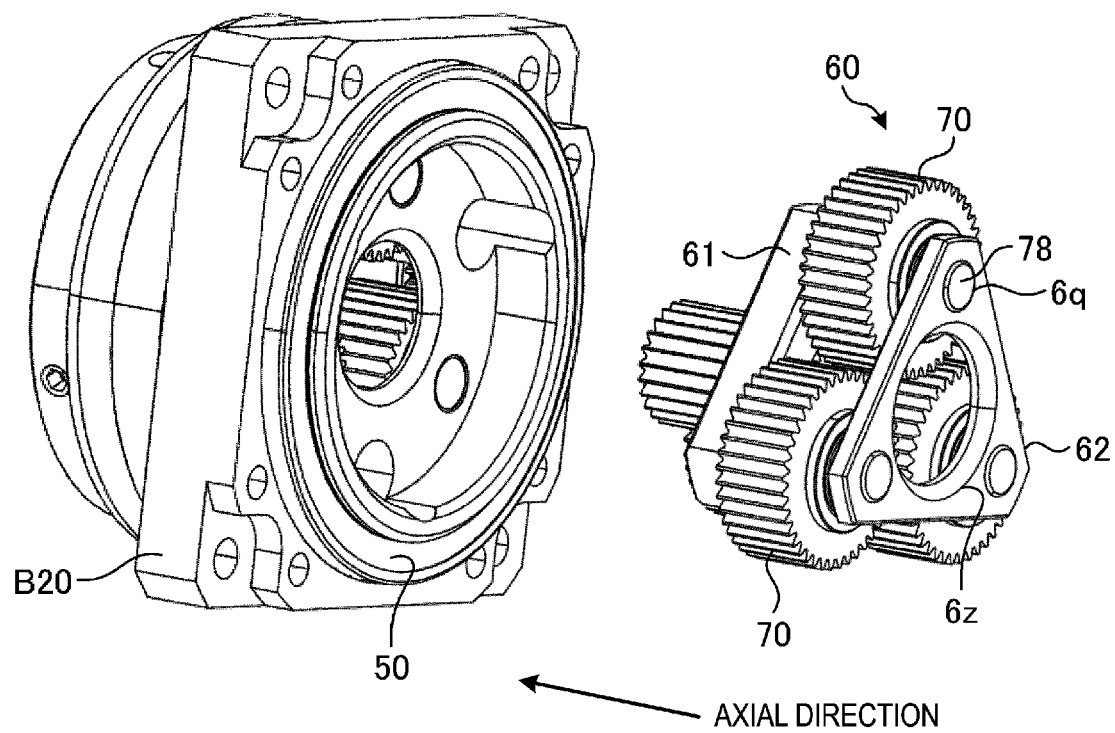
FIG. 17 is a perspective view illustrating an example of attachment of a second carrier to a first carrier according to the second embodiment.

In the second embodiment, the second carrier 60 includes a base part 61 and a bushing 62 as illustrated in FIGS. 16 and 17. FIG. 16 is an exploded perspective view illustrating an example of the speed reducer according to the second embodiment. FIG. 17 is a perspective view illustrating an example of attachment of the second carrier to the first carrier according to the second embodiment. Through holes 6p and a through hole 69 are formed in the base part 61 as illustrated in FIGS. 16 and 17. Through holes 6q and a through hole 6z are formed in the bushing 62. Second planetary shafts 78 are inserted into the through holes 6p and the through holes 6q. The bushing 62 is press-fitted into the base part 61 via the second planetary shafts 78. The adapter B89 is press-fitted into the through hole 6z, and the first sun gear B84 is press-fitted into the through hole 69. Thus, the second carrier 60 rotates in conjunction with the rotation of the adapter B89. Furthermore, the first sun gear B84 rotates in conjunction with the rotation of the second carrier 60. Note that the base part 61 and the bushing 62 are examples of a pair of support members.

Figure 18:
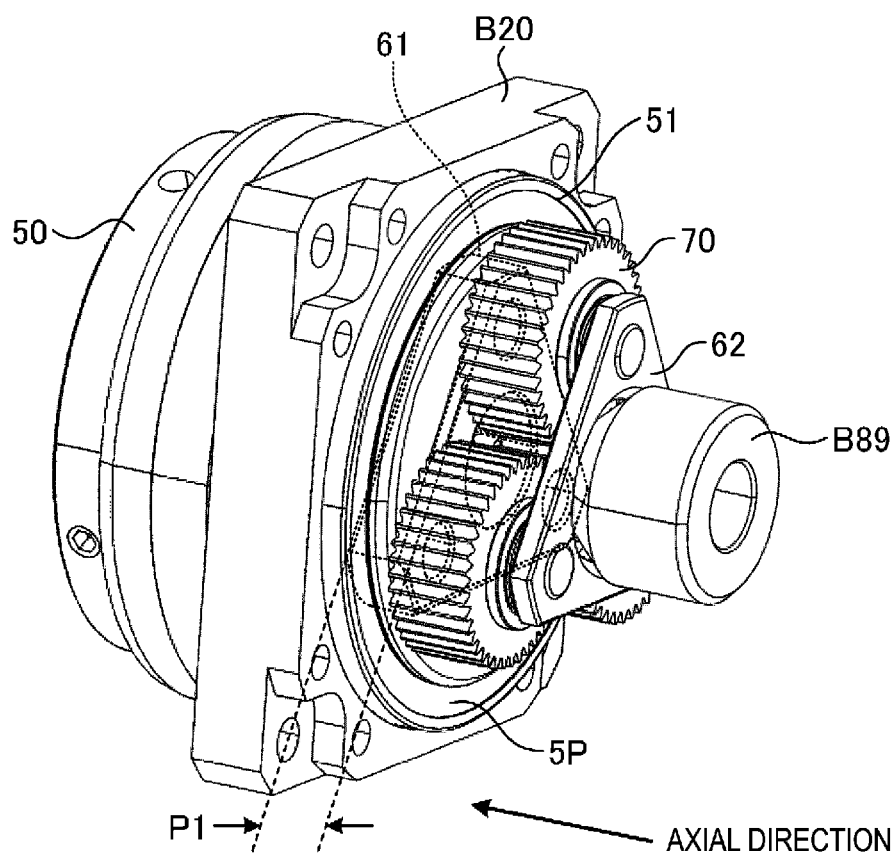
FIG. 18 is a perspective view illustrating an example of the second carrier attached to the first carrier according to the second embodiment.

A part of the base part 61 protrudes further toward the positive direction side in the axial direction than the end part of the revolving part 50 at the negative direction side in the axial direction as illustrated in FIG. 18. FIG. 18 is a perspective view illustrating an example of the second carrier attached to the first carrier according to the second embodiment. The end part of the base part 61 at the positive direction side in the axial direction protrudes further toward the positive direction side in the axial direction than the end part 5P of the revolving part 50 at the negative direction side in the axial direction by a length P1 as illustrated in FIG. 18. In this case, for example, the base part 61 faces the bearing 51 in the radial direction. In this configuration, the length of the speed reducer including the two-staged planetary gears in the axial direction can be reduced. Note that, although an example of the length P1 substantially equal to the thickness (size in the axial direction) of the base part 61 has been described, the relationship between the length P1 and the height of the base part 61 is not limited to the configuration, and for example, only a part of the base part 61 may protrude from the end part 5P, or a part of the second planetary gears 70 may also protrude from the end part 5P.

Figure 19:
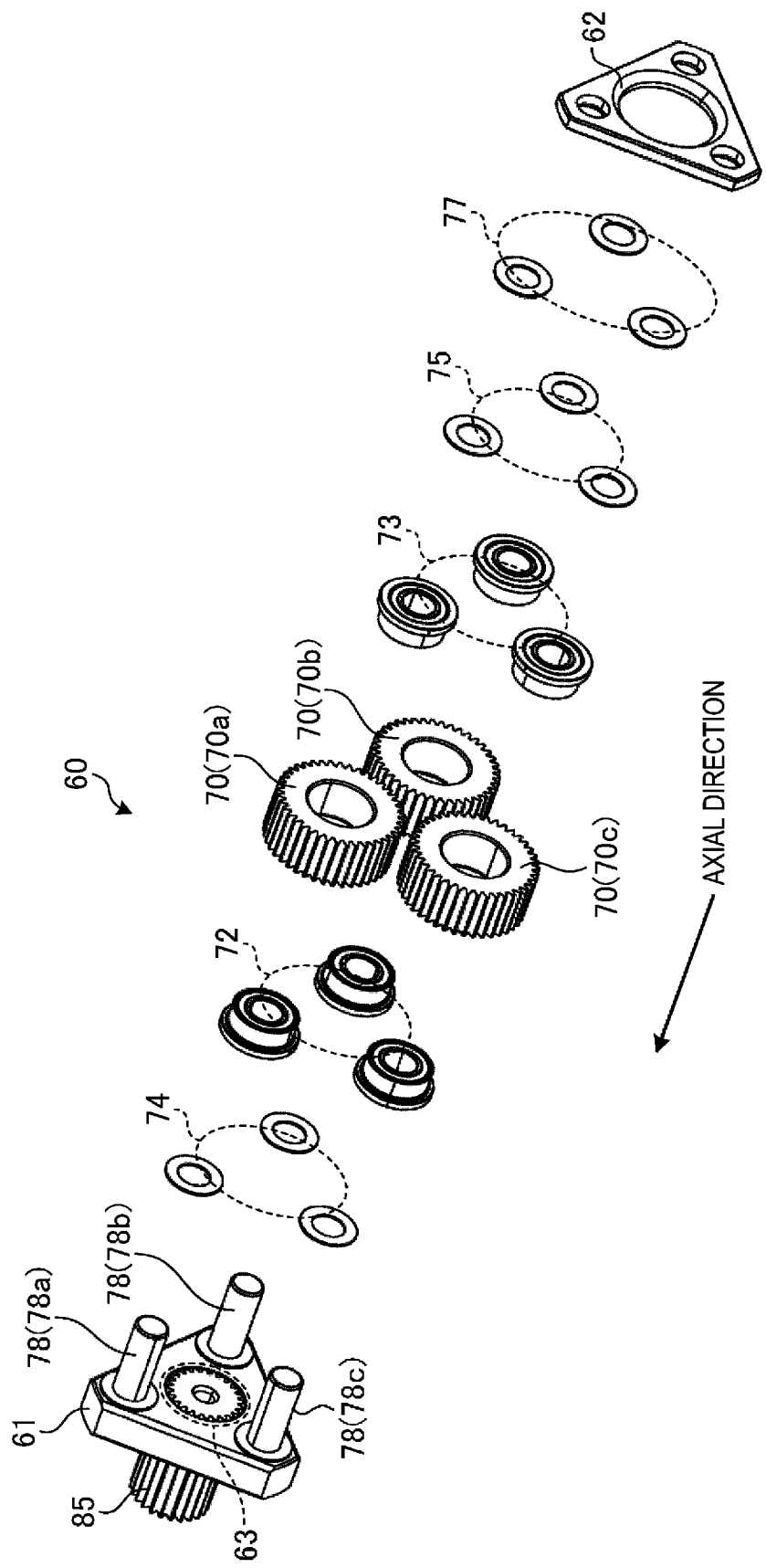
FIG. 19 is an exploded perspective view illustrating an example of the second carrier according to the second embodiment.

The second planetary gears 70 are supported by the second planetary shafts 78 via a pair of bearings 72 and 73 in the radial direction, for example, as illustrated in FIG. 19. In addition, the bearings 72 and 73 are further supported by wave washers 77 in addition to washers 74 and 75. FIG. 19 is an exploded perspective view illustrating an example of the second carrier according to the second embodiment. In the second embodiment, for the bearings 72 and 73, bearings having a diameter smaller than the diameter of the bearing 41, for example, are used. The bearings 72 and 73 are ball bearings, for example. In addition, the bearings 72 and 73 may also have flanges in the axial direction, for example.

The three washers 74 are disposed between the base part 61 of the second carrier 60 and the bearings 72 in the axial direction as illustrated in FIG. 19. The three washers 75 are disposed between the bearings 73 and the bushing 62 in the axial direction.

In addition, the wave washers 77 are further disposed between the bushing 62 and the washers 75 in the axial direction as illustrated in FIG. 19. The wave washers 77 are deformed by being pressed toward the positive direction side in the axial direction by the bushing 62. Accordingly, since the bearings 72 and 73 support the planetary gears 70 having no gap in the axial direction, the support accuracy for the planetary gears 70 is improved, the durability of the gears can be improved, and backlash can be reduced.

As described above, the speed reducer B2 according to the second embodiment includes the first carrier 30 located at one side in the axial direction and the second carrier 60 located at the other side in the axial direction. A plurality of first planetary gears 40 are accommodated in the first carrier 30. A plurality of second planetary gears 70 are accommodated in the second carrier 60. The base part 61 corresponding to an end part at one side of the second carrier 60 in the axial direction protrudes further toward one side in the axial direction than the end part 5P of the first carrier 30 at the other side in the axial direction. With this configuration, the length of the speed reducer B2 in the axial direction can be reduced.

Modifications

Although the configuration of each of the embodiments has been described above, the embodiments are not limited to the configuration. For example, the wave washers 77 may be disposed between the base part 61 and the washers 74 at the positive direction side in the axial direction. In addition, although, in the embodiment, the inner diameter R1 of the through hole 29 is smaller than the inner diameter R2 of the through hole 19, the embodiment is not limited to this, and the inner diameter R1 and the inner diameter R2 may be substantially the same, or the inner diameter R1 may be greater than the inner diameter R2.

In addition, in the first main body part 20 in the second embodiment, for example, a spigot part 21 having substantially the same shape as the spigot part 21 of the main body part 20 in the first embodiment is formed. In addition, in the first main body part 20, the second screw 92 is fixed to a screw groove having substantially the same shape as the screw groove 2v illustrated in FIG. 3. However, the shape of the first main body part is not limited to the above-described shape. For example, in a first main body part C20, a spigot part C21 may have a shape cut out in the radial direction, or may have a through hole C2q instead of the screw groove 2v as illustrated in FIGS. 20 to 22.

Figure 20:
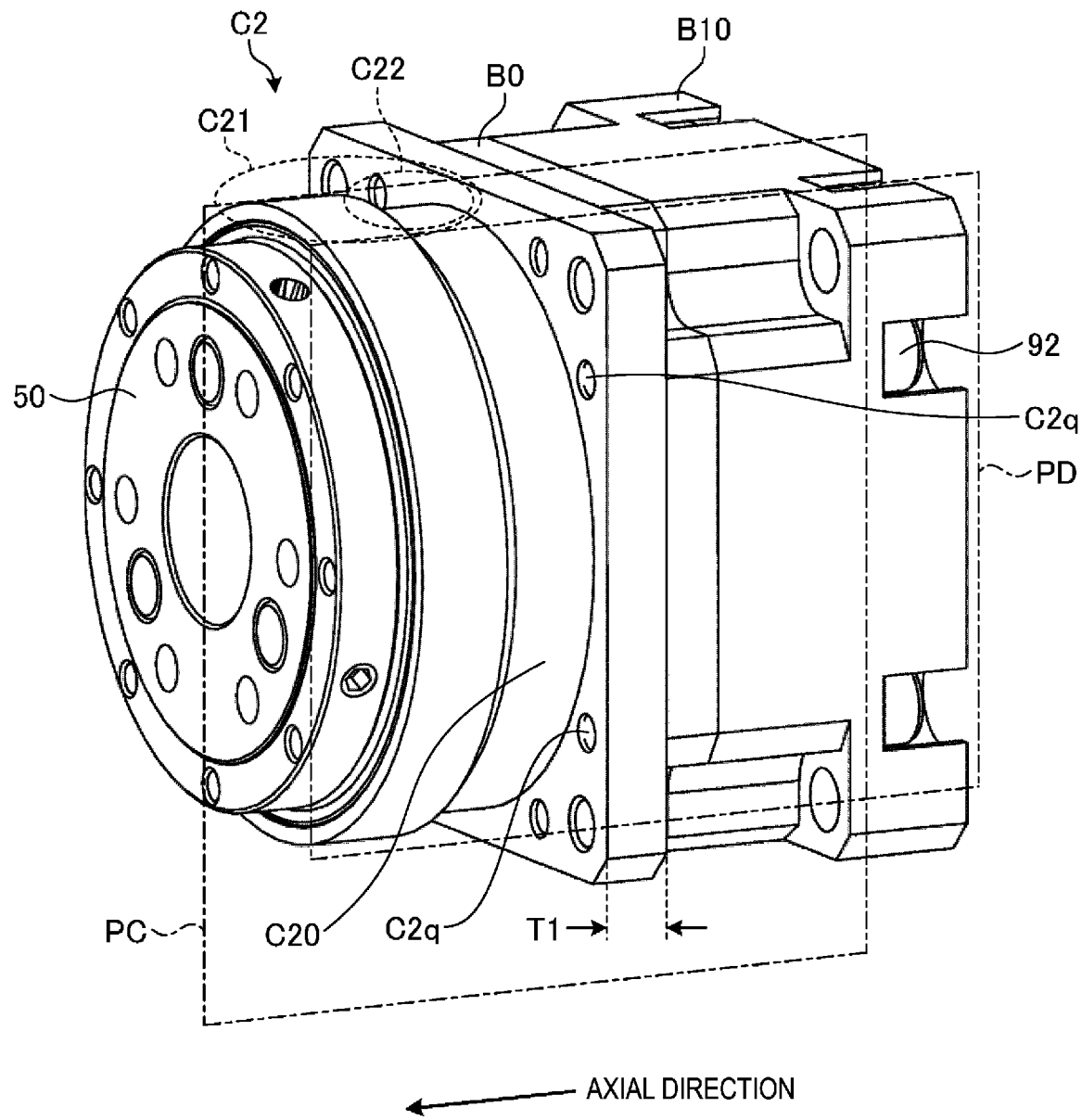
FIG. 20 is a perspective view illustrating an example of a speed reducer according to a second modification.

FIG. 20 is a perspective view illustrating an example of a speed reducer according to a second modification. FIG. 21 is a cross-sectional perspective view illustrating the example of the speed reducer according to the second modification. FIG. 22 is a side cross-sectional view illustrating an example of the speed reducer according to the second modification. FIG. 21 illustrates a cross section cut along the plane PC illustrated in FIG. 20. FIG. 22 illustrates a cross section cut along the plane PD illustrated in FIG. 20. Note that the outer diameter of a second sun gear C85 in the second modification is greater than the outer diameter of the second sun gear 85 in the second embodiment as illustrated in FIG. 21. In addition, an adapter C89 is also formed to mesh with the second sun gear C85.

Figure 21:
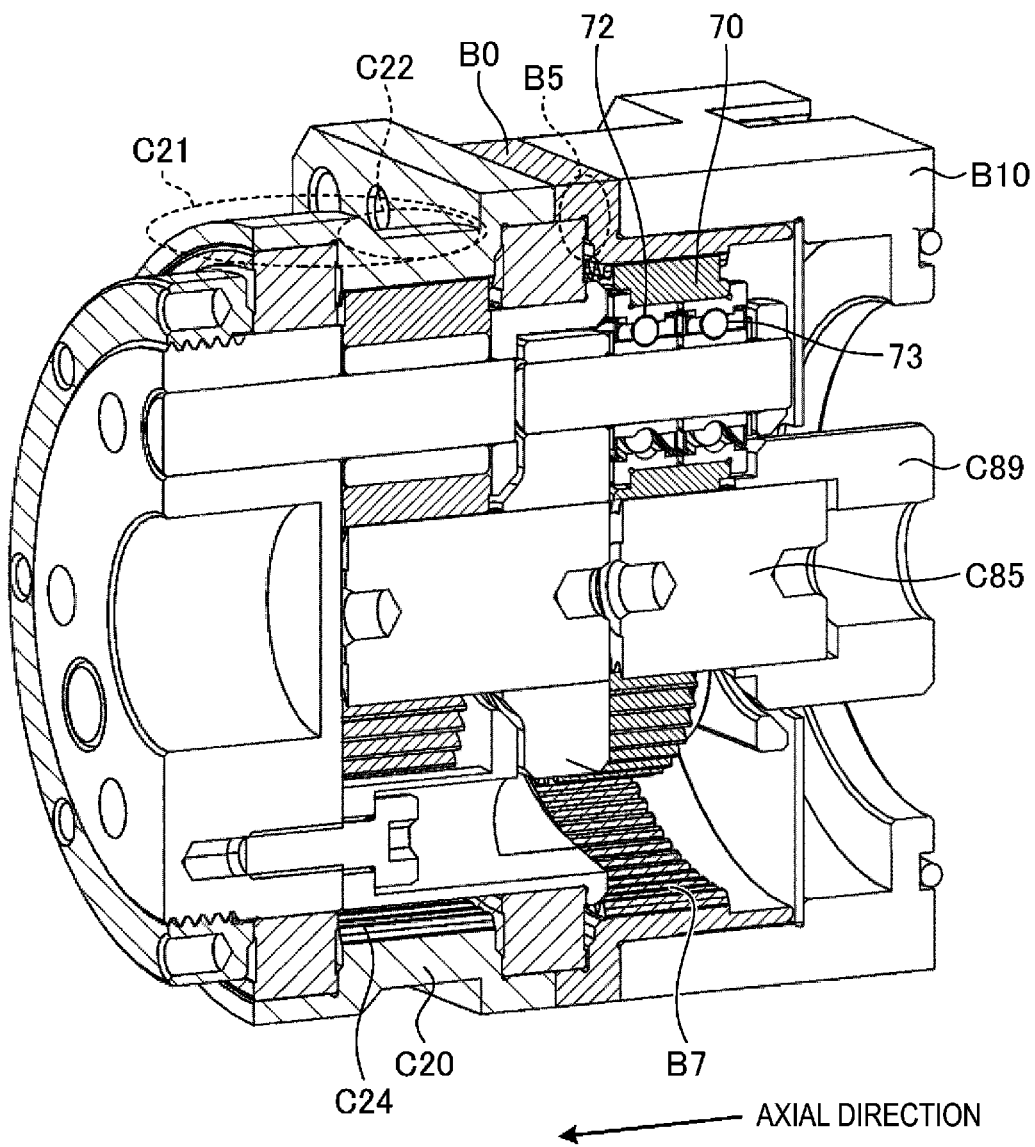
FIG. 21 is a cross-sectional perspective view illustrating the example of the speed reducer according to the second modification.
Figure 22:
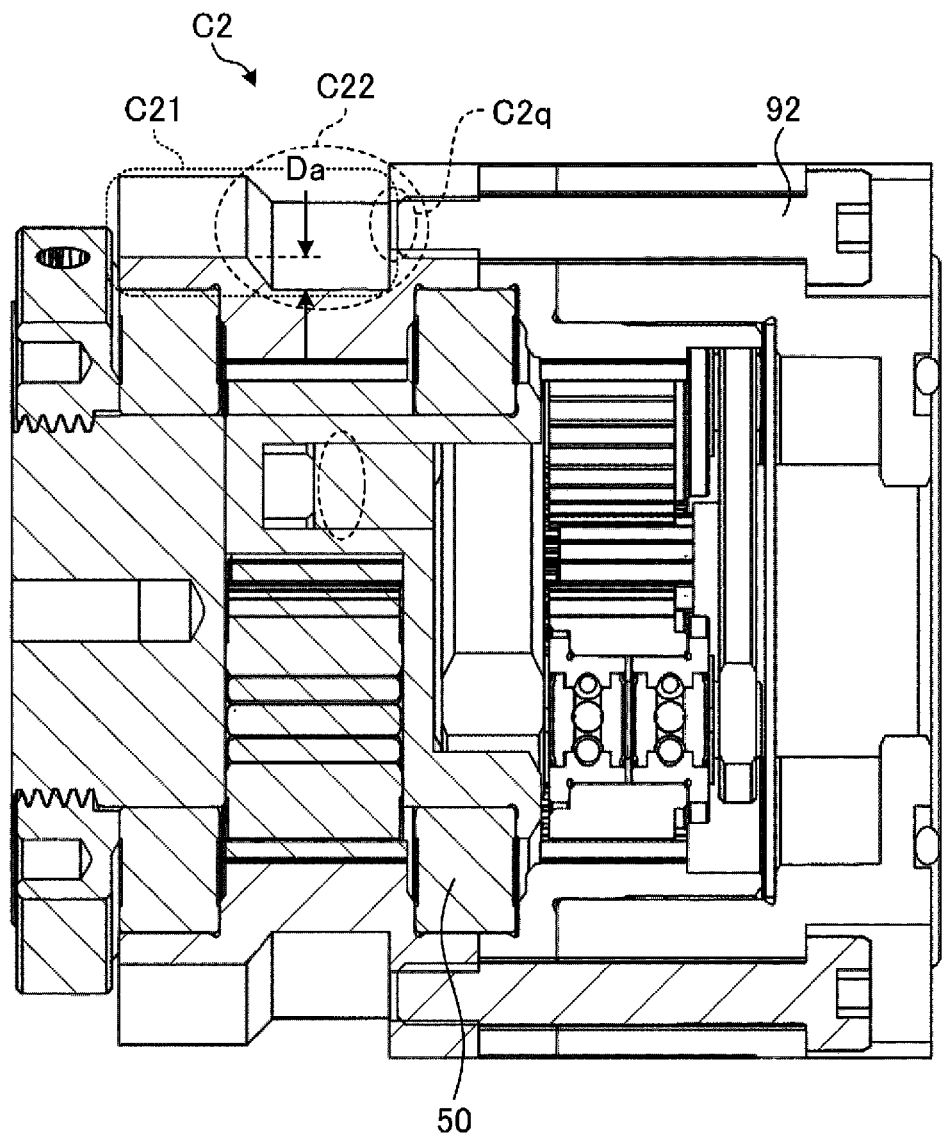
FIG. 22 is a side cross-sectional view illustrating an example of the speed reducer according to the second modification.

The spigot part C21 formed in the first main body part C20 in the second modification further includes a cutout part C22 having a size in the radial direction smaller than the size of other parts as illustrated in FIG. 21. Note that, in the second modification, a depth Da (a size in the radial direction) of the cutout part C22 illustrated in FIG. 22 is, for example, equal to or greater than 2 mm, and is in a range ensuring a strength of a first internal gear C24 illustrated in FIG. 21. According to this configuration, since the weight of the first main body part C20 can be reduced (for example, about 5% of the entire weight of the speed reducer C2), the speed reducer C2 can be reduced in weight.

In addition, in the second modification, a second screw 92 is fixed to a through hole C2q formed in the first main body part C20. According to this configuration, an effective screw length (a meshing length between the second screw 92 and the first main body part C20) can be sufficiently secured even when the first main body part C20 is reduced in thickness (length in the axial direction) T1 as compared with the case of having the screw groove 2v. In addition, since the cutout part C22 is formed in the spigot part C21, even when the second screw 92 protrudes from the through hole C2q toward the positive direction side in the axial direction, the second screw 92 can be prevented from interfering with the spigot part C21. Thus, the speed reducer C2 can be further reduced in weight.

In addition, for the second planetary gears 70, ball bearings having a flange as described above may be used in order to ensure the size of the bearings. However, since the length of the flange portion of the ball bearings needs to be checked in addition to the lengths of the planetary gears 70 in the axial direction, the length of the speed reducer in the axial direction is increased.

Figure 23:
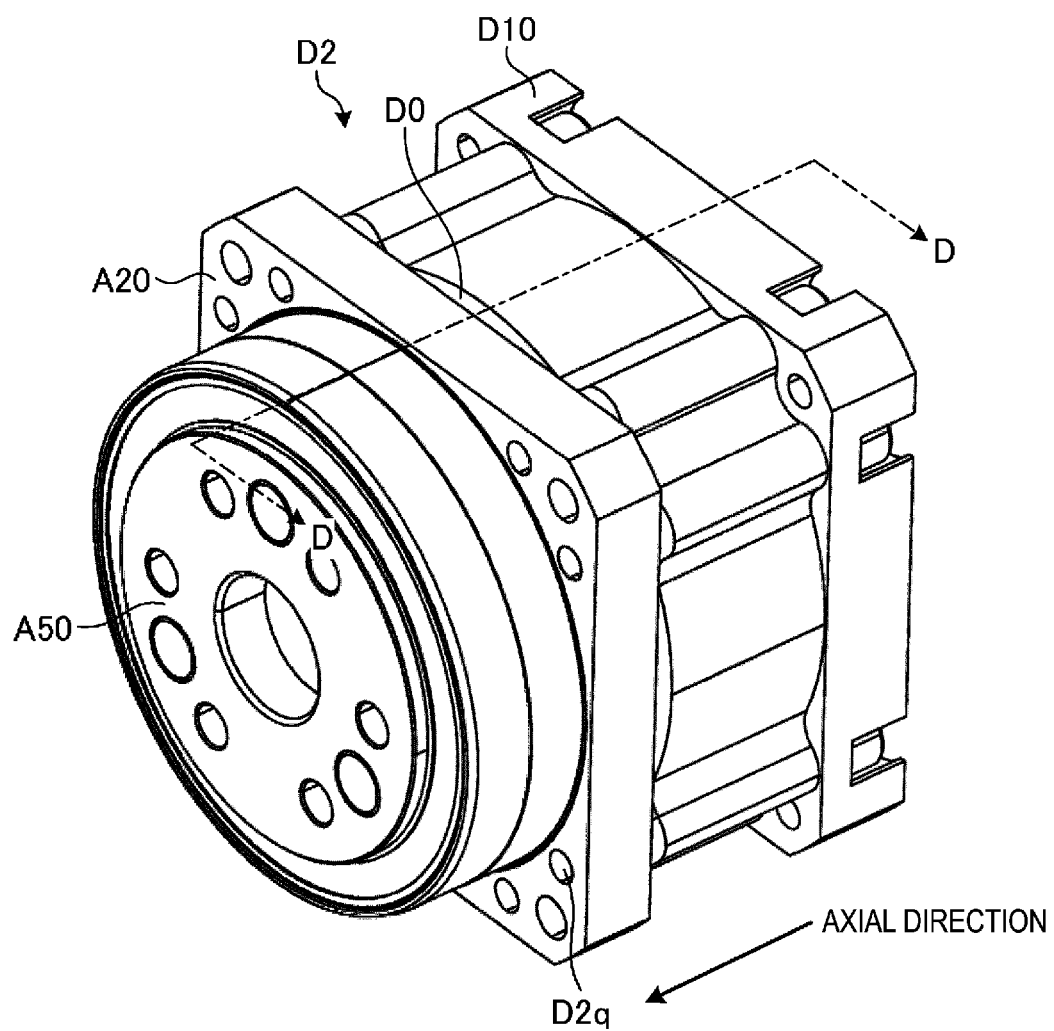
FIG. 23 is a perspective view illustrating an example of a speed reducer according to a third modification.
Figure 24:
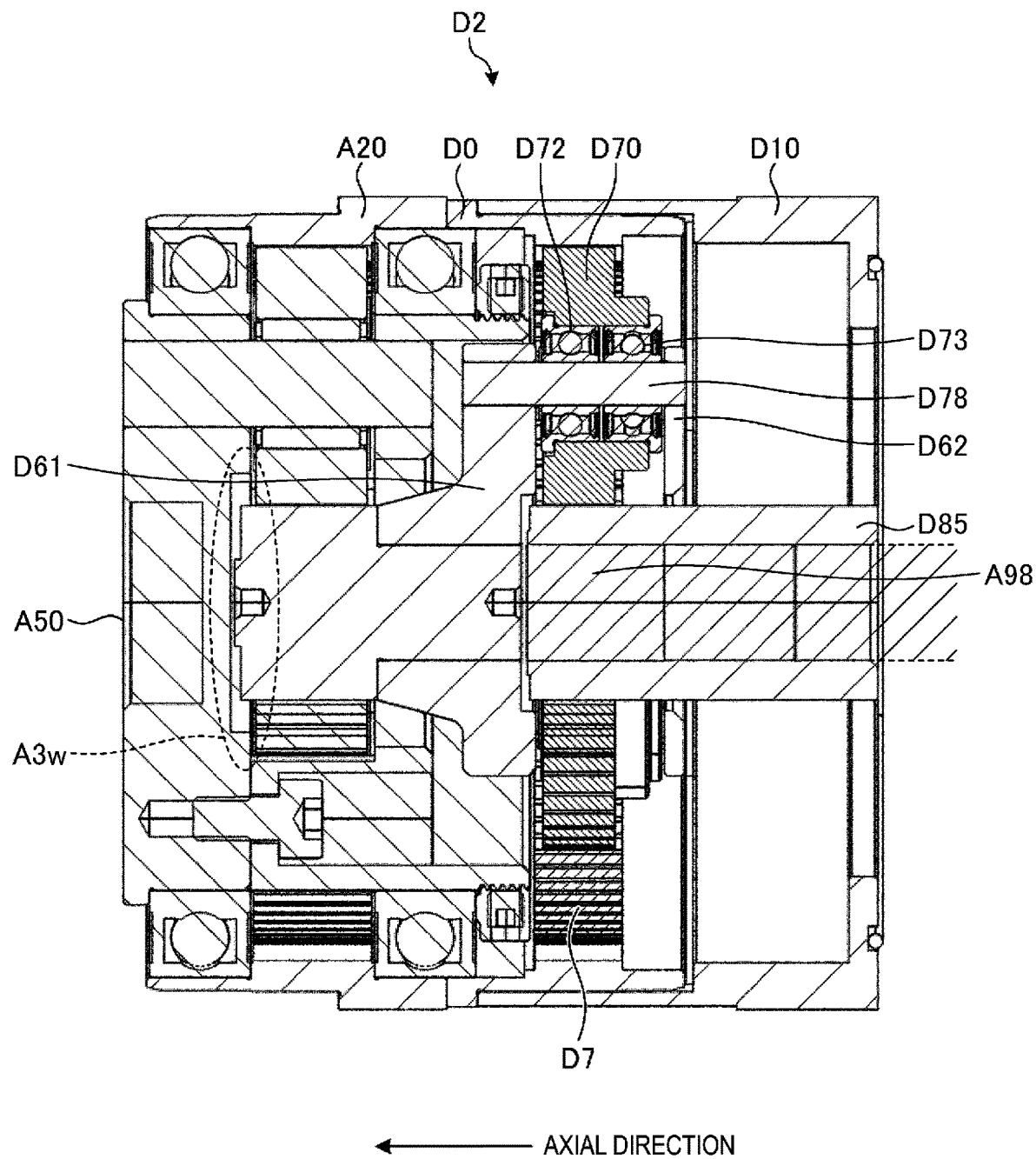
FIG. 24 is a side cross-sectional view illustrating an example of the speed reducer according to the third modification.
Figure 25:
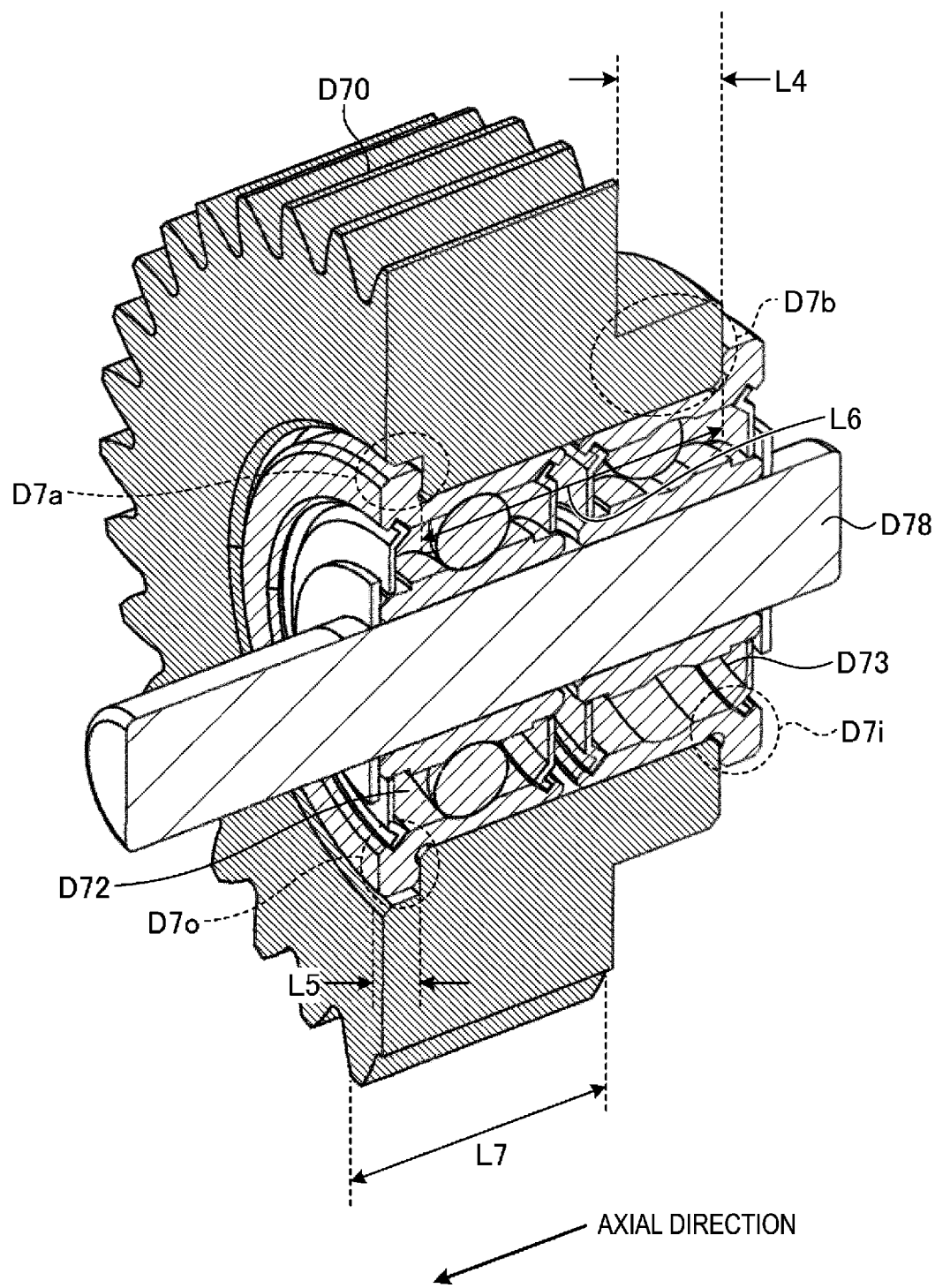
FIG. 25 is a cross-sectional perspective view illustrating an example of a planetary gear according to the third modification.

Therefore, in a third modification, a configuration of the second planetary gears provided with a projecting portion and a recessed portion will be described. FIG. 23 is a perspective view illustrating an example of a speed reducer according to the third modification. FIG. 24 is a side cross-sectional view illustrating an example of the speed reducer according to the third modification. FIG. 25 is a cross-sectional perspective view illustrating an example of a planetary gear according to the third modification. FIGS. 24 and 25 illustrate a cross section cut along line D-D in FIG. 23. The speed reducer D2 in the third modification includes a coupling part D10, a first main body part A20, and a second main body part DO as illustrated in FIG. 24.

A second planetary gear D70 of the third modification includes a recessed portion D7a cut out from the positive direction side in the axial direction toward the negative direction side in the axial direction and a projecting portion D7b protruding toward the negative direction side in the axial direction as illustrated in FIG. 25. The recessed portion D7a is cut out by a depth (size in the axial direction) L5, and the projecting portion D7b protrudes by a length (size in the axial direction) L4 as illustrated in FIG. 25. The second planetary gear D70 meshes with a second internal gear D7 formed in the second main body part DO.

A bearing D72 in the third modification includes a flange D7o protruding radially outward at the output side (positive direction side in the axial direction) as illustrated in FIG. 25. In addition, a bearing D73 includes a flange D7i protruding radially outward at the input side (negative direction side in the axial direction). Note that, like the bearings 72 and 73 of the second embodiment, the bearings D72 and D73 may be pressed by wave washers or the like. Note that a second planetary shaft D78 rotatably supporting a second planetary gear 70 via the bearings D72 and D73 is press-fitted into a base part D61 and a bushing D62 of a second carrier D60.

In this configuration, the recessed portion D7a of the second planetary gear D70 holds the flange D7o of the bearing D72 in the axial direction as illustrated in FIG. 25. In addition, the projecting portion D7b of the second planetary gear D70 is holded by the flange D7i of the bearing D73 in the axial direction.

According to this configuration, an interval L6 between the flanges of the two bearings D72 and D73 in the axial direction can be made greater than a length L7 of the tooth tip of the second planetary gear D70 in the axial direction. This allows a larger-sized bearing to be used.

In addition, the speed reducer D2 according to the third modification may include a revolving part A50 having a nut 54 mounted from the negative direction side in the axial direction as in the first modification as illustrated in FIG. 24, and the output shaft of a motor A9 may be press-fitted to the radially inner side of a second sun gear D85. In addition, a through hole D2q allowing the second screw 92 to be fixed may be formed in the first main body part D20 in the third modification as illustrated in FIG. 23, as in the first and second modifications. According to this configuration, the thicknesses (sizes in the axial direction) of the speed reducer D2 can be further reduced, similarly to the first and second modifications.

Note that, the positions of the recessed portion D7a and the projecting portion D7b formed in the second planetary gear D70 illustrated in the third modification are merely examples, and for example, the projecting portion may be formed at the positive direction side in the axial direction and the recessed portion may be formed at the negative direction side in the axial direction.

Although the present invention has been described above based on the embodiments and the modifications, the present invention is not limited to the embodiments and the modifications, and it goes without saying that various changes can be made without departing from the gist of the present invention. Various modifications within a scope not departing from the gist are also included in the technical scope of the present invention, and this is obvious to a person having skill in the art from the description of the claims.

REFERENCE SIGNS LIST

1, A1 Drive device, 2, A2, B2, C2, D2 Speed reducer, 9, A9 Motor, 10, A10, B10, D10 Coupling part, 15, A15 Receiving part, 19, 1u Through hole, 20, A20, B20, C20 Main body part (first main body part), 21, C21 Spigot part, C22 Cutout part, 24, A24, C24 Internal gear (first internal gear), 25, 26, B5 Receiving part, 29, A2q, C2q, D2q Through hole, 2v Screw groove, 30, A30 Carrier (first carrier), 31, A31 First member, 32, A32 Second member, 33, A33, 34, A34 Outer ring, 35, A35 Outer screw, 36, A36 Flange, 37, A37 Coupling surface, 38 Strut, 3t, 3x, 3u, 3z, A3z Through hole, A3w Recessed portion, 3v Screw groove, 40 Planetary gear (first planetary gear), 41 Bearing (first bearing), 48 Planetary shaft (first planetary shaft), 50, A50 Revolving part, 51, 52 Bearing, 53, 54 Nut, 60, D60 Second carrier, 61, D61 Base part, 62 Bushing, 69, 6p, 6q, 6z Through hole, 70, D70 Second planetary gear, 72, 73, D72, D73 Bearing, 74, 75 Washer, 77 Wave washer, 78, D78 Second planetary shaft, 84, A84, B84 Sun gear (first sun gear), 85, C85, D85 Second sun gear, 89, B89, C89 Adapter, 91 First screw, 92 Second screw, 93 Third screw, 98, A98 Output shaft, 99, A99 Screw groove, B0, D0 Second main body part, B7, D7 Second internal gear, T00 Tool

The invention claimed is:

1. A speed reducer comprising:
a sun gear;
an internal gear;
a first planetary gear meshing with the sun gear and the internal gear;
two bearings disposed to sandwich the first planetary gear in an axial direction;
a coupling part fixed to a motor, and
a joining member bonding the motor and the coupling part;
wherein at least one of the two bearings is pressed against the internal gear in an axial direction by an engaging member;
a main body part on which the internal gear is formed supports at least one of the two bearings in a radial direction;
the two bearings have a same size in a radial direction;
the coupling part supports at least one of the bearings, which is supported by the main body part, in a radial direction;
a length of the joining member in an axial direction is larger than an interval between the coupling part and the main body part in an axial direction;
the coupling part includes a hole part enabling the joining member to be inserted;
the main body part includes a hole part formed at a position facing the hole part in an axial direction, and
an inner diameter of the hole part formed in the main body part is smaller than an inner diameter of the hole part formed in the coupling part.

2. The speed reducer according to claim 1,
wherein a portion having an outer diameter smaller than an outer diameter of another portion in an axial direction of the main body part is formed at a position in the main body part facing the first planetary gear in a radial direction.

3. The speed reducer according to claim 1,
wherein the engaging member is positioned at one side in an axial direction, and presses the bearing positioned at the one side among the two bearings against the internal gear.

4. The speed reducer according to claim 1, wherein the main body part supports both of the two bearings in a radial direction.

5. The speed reducer according to claim 1,
wherein a tooth tip of the internal gear is positioned at a radially inner side of an outer ring of the two bearings in a radial direction, and
an outer diameter of the two bearings is positioned at a radially outer side of a tooth tip of the first planetary gear in a radial direction.

6. A speed reducer comprising:
a sun gear;
an internal gear;
a first planetary gear meshing with the sun gear and the internal gear;
two bearings disposed to sandwich the first planetary gear in an axial direction;
a coupling part fixed to a motor, and
a first carrier including a first member formed at one side of the first planetary gear in an axial direction; and a second member formed at the other side of the first planetary gear in an axial direction and facing the first member with the first planetary gear sandwiched between the first member and the second member in an axial direction,
wherein at least one of the two bearings is pressed against the internal gear in an axial direction by an engaging member,
a main body part on which the internal gear is formed supports at least one of the two bearings in a radial direction,
the two bearings have a same size in a radial direction,
the coupling part supports at least one of the bearings, which is supported by the main body part, in a radial direction,
the first member and the second member are coupled by a planetary shaft supporting the first planetary gear, and
the first carrier is supported by the two bearings facing each other having the first planetary gear sandwiched between the bearings in an axial direction.

7. The speed reducer according to claim 6,
wherein the second member includes at least one strut, the strut being adjacent to the first planetary gear in a circumferential direction, being in contact with the first member in an axial direction, and protruding toward one side in an axial direction, and the first member and the second member are fixed to each other by a locking member inserted into the strut.

8. The speed reducer according to claim 6, wherein the first member includes at least one strut, the strut being adjacent to the first planetary gear in a circumferential direction, being in contact with the second member in an axial direction, and protruding toward the other side in an axial direction, and the first member and the second member are fixed to each other by a locking member inserted into the strut.

9. The speed reducer according to claim 6, further comprising:

the first carrier positioned at one side in an axial direction; and a second carrier positioned at the other side in an axial direction, wherein the first carrier holds a plurality of the first planetary gears, the second carrier holds a plurality of second planetary gears, and an end part of the second carrier at the one side in an axial direction protrudes further toward the one side in an axial direction than an end part of the first carrier at the other side in an axial direction.

10. The speed reducer according to claim 9, wherein the first carrier is supported by two bearings, the two bearings being disposed at a radially outer side of the first carrier and facing in an axial direction, and at least a portion of the second carrier in an axial direction faces at least one of the two bearings in a radial direction.

11. The speed reducer according to claim 9, wherein the second carrier includes a planetary shaft inserted into a center of the second planetary gear in a radial direction and supporting the second planetary gear, a pair of bearings disposed between the second planetary gear and the planetary shaft in a radial direction, and a pair of support members supporting the second planetary gear from both sides in an axial direction, wherein a wave washer is disposed between, in an axial direction, one of the pair of bearings at the other side in an axial direction and one of the pair of the support members at the second carrier at the other side in an axial direction.

12. The speed reducer according to claim 9, wherein the second carrier includes:

a planetary shaft inserted into a center of the second planetary gear in a radial direction and supporting the second planetary gear, and a pair of bearings disposed between the second planetary gear and the planetary shaft in a radial direction, wherein the second planetary gear includes, in a radially inner side, a projecting portion protruding toward the other side in an axial direction and a recessed portion cut out from the one side in an axial direction toward the other side in an axial direction, the pair of bearings includes a flange protruding radially outward, and the flange of one of the pair of bearings positioned at the other side in an axial direction faces the projecting portion in an axial direction, and the flange of the other bearing positioned at the other side in an axial direction faces the recessed portion in an axial direction.

* * * * *